(12) United States Patent
Aspell et al.

(10) Patent No.: US 11,441,756 B2
(45) Date of Patent: Sep. 13, 2022

(54) VERTICALLY INTEGRATED TRANSMISSIVE MICROSTRUCTURES FOR TRANSFORMING LIGHT HAVING LAMBERTIAN DISTRIBUTION

(71) Applicant: Brightview Technologies, Inc., Durham, NC (US)

(72) Inventors: Jennifer Aspell, Durham, NC (US); Kenneth L. Walker, Durham, NC (US); Bing Shen, Cary, NC (US)

(73) Assignee: Brightview Technologies, Inc., Durham, NC (US)

( * ) Notice: Subject to any disclaimer, the term of this patent is extended or adjusted under 35 U.S.C. 154(b) by 0 days.

(21) Appl. No.: 16/973,689

(22) PCT Filed: Jun. 13, 2019

(86) PCT No.: PCT/US2019/037035
§ 371 (c)(1),
(2) Date: Dec. 9, 2020

(87) PCT Pub. No.: WO2019/245871
PCT Pub. Date: Dec. 26, 2019

(65) Prior Publication Data
US 2021/0231290 A1    Jul. 29, 2021

Related U.S. Application Data

(60) Provisional application No. 62/688,757, filed on Jun. 22, 2018.

(51) Int. Cl.
*F21V 5/00* (2018.01)
*F21K 9/65* (2016.01)
(Continued)

(52) U.S. Cl.
CPC .......... *F21V 5/005* (2013.01); *F21K 9/65* (2016.08); *F21K 9/68* (2016.08); *F21K 9/90* (2013.01); *F21V 5/02* (2013.01); *F21Y 2115/10* (2016.08)

(58) Field of Classification Search
CPC ... F21V 5/005; F21V 5/02; F21K 9/65; F21K 9/68; F21K 9/90; F21Y 2115/10
(Continued)

(56) References Cited

U.S. PATENT DOCUMENTS 8,262,273 B2    9/2012   Yu et al.
2004/0190102 A1*  9/2004  Mullen ............ B29D 11/00605
                                                    359/237
(Continued)

FOREIGN PATENT DOCUMENTS

CN      1836175 A    9/2006
CN      1894605 A    1/2007
(Continued)

OTHER PUBLICATIONS

International Search Report and Written Opinion dated Aug. 19, 2019, for International Patent Application No. PCT/US2019/037035.
(Continued)

*Primary Examiner* — Andrew J Coughlin
*Assistant Examiner* — Jessica M Apenteng
(74) *Attorney, Agent, or Firm* — Rauschenbach Patent Law Group, PLLC

(57) ABSTRACT

A light transmissive substrate for transforming a Lambertian light distribution includes a base film having a first side and a second side opposite the first side, a plurality of first microstructures disposed on the first side of the base film and a plurality of first valleys. Each of the first valleys is defined by a pair of adjacent first microstructures. A filler material is
(Continued)

disposed in the plurality of first valleys and defines a substantially planar surface spaced from and substantially parallel to the first side of the base film. The substrate also includes a plurality of second microstructures disposed on the substantially planar surface of the filler material and a plurality of second valleys. Each of the second valleys is defined by a pair of adjacent second microstructures.

26 Claims, 22 Drawing Sheets

(51) Int. Cl.
*F21K 9/68* (2016.01)
*F21K 9/90* (2016.01)
*F21V 5/02* (2006.01)
*F21Y 115/10* (2016.01)

(58) Field of Classification Search
USPC .......................................................... 362/339
See application file for complete search history.

(56) References Cited

U.S. PATENT DOCUMENTS

| | | | |
|---|---|---|---|
| 2005/0041311 A1* | 2/2005 | Mi | G02B 6/0053 359/831 |
| 2009/0079905 A1 | 3/2009 | Kimura et al. | |
| 2014/0104690 A1 | 4/2014 | Sandre-Chardonnal | |
| 2014/0313587 A1* | 10/2014 | Aronson | G02B 5/3033 359/640 |
| 2015/0070328 A1 | 3/2015 | Yamaguchi | |
| 2017/0146214 A1 | 5/2017 | Purchase | |

FOREIGN PATENT DOCUMENTS

| | | |
|---|---|---|
| CN | 101326459 A | 12/2008 |
| CN | 103363400 A | 10/2013 |
| CN | 203455501 U | 2/2014 |
| CN | 104285196 A | 1/2015 |
| CN | 204945419 U | 1/2016 |

OTHER PUBLICATIONS

"Notification Concerning Transmittal of International Preliminary Report on Patentability (Chapter I of the Patent Cooperation Treaty)" for International Patent Application No. PCT/US2019/037035, dated Dec. 30, 2020, 7 pages, The International Bureau of WIPO, Geneva, Switzerland.

Office Action received for Chinese Patent Application No. 201980042126.6, dated Jun. 23, 2033, 17 pages (9 pages of English Translation and 8 pages of Official Copy).

* cited by examiner

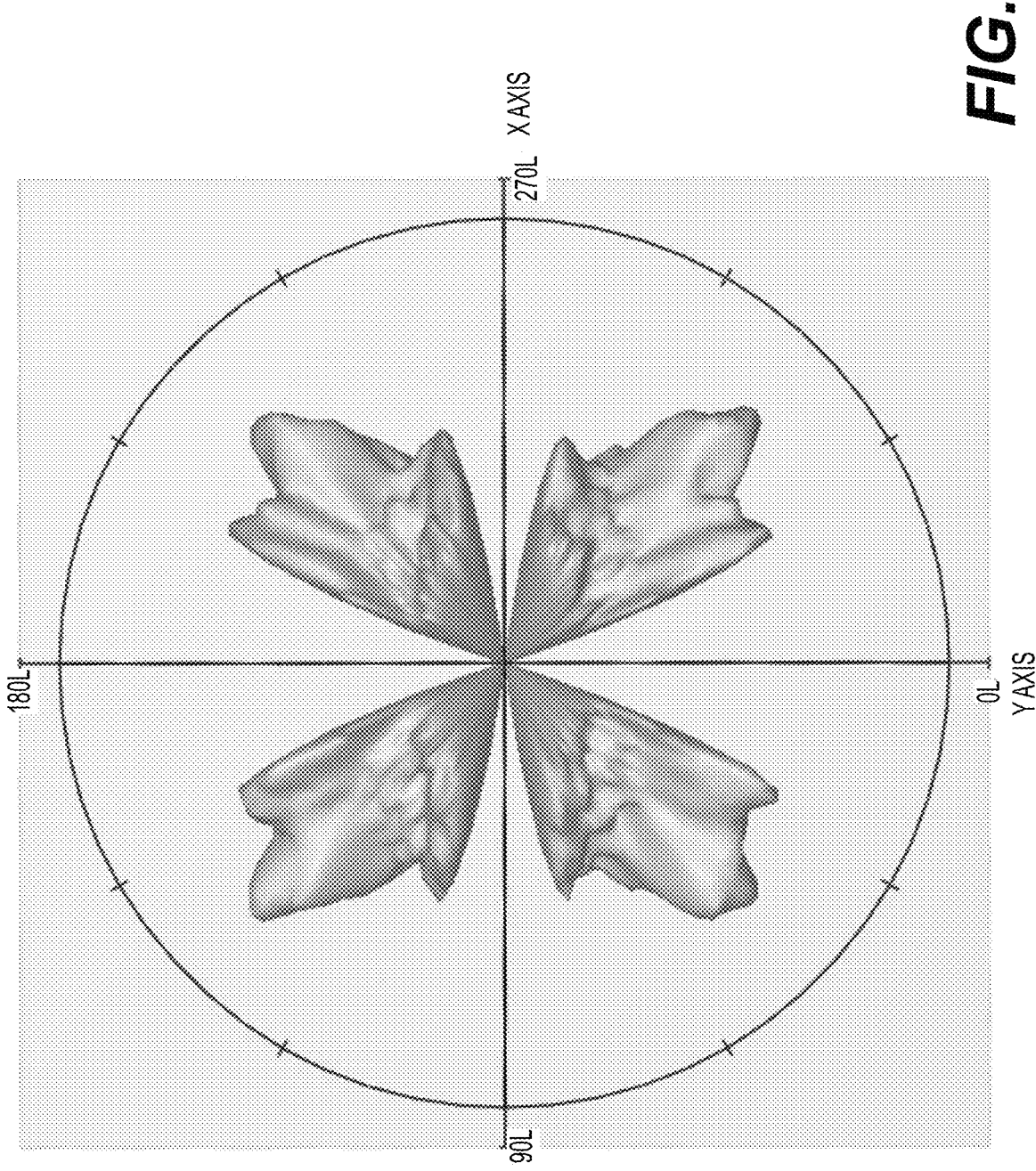

VERTICALLY INTEGRATED TRANSMISSIVE MICROSTRUCTURES FOR TRANSFORMING LIGHT HAVING LAMBERTIAN DISTRIBUTION

CROSS-REFERENCE TO RELATED APPLICATION(S)

This is a National Stage Entry into the United States Patent and Trademark Office from International Patent Application No. PCT/US2019/037035, filed on Jun. 13, 2019, which relies on and claims priority to U.S. Patent Application No. 62/688,757, filed on Jun. 22, 2018, the entire contents of both of which are incorporated herein by reference.

FIELD

The present invention is related to vertically integrated microstructures for transforming light having a Lambertian distribution.

BACKGROUND

Light emitting diodes (LEDs) have quickly become the primary light generating device for current applications. Intrinsically, an LED emits the light in a Lambertian distribution, characterized by the strongest intensity at the emitting direction (zero degrees or "nadir"). Light intensity decreases following the cosine function of the angles deviated from the zero-degree (nadir) emitting direction and reduces to zero as the angle reaches 90 degrees from nadir, as illustrated in FIG. 1. Such a distribution is not desirable for many applications.

For example, when an LED is used to illuminate a flat surface target, the light traveling path length varies for different target locations. Typically, the path length is the shortest at the zero-degree direction where the LED emits the highest light intensity, which forces designers to increase the light source density to achieve a good illumination uniformity over the desired area.

For applications that require uniform or even illumination over a desired area of a flat plane with low light source density, such as the back light units for displays or lighting projects for a large area, the light source should deliver light energy in the reverse fashion of a Lambertian distribution, i.e. reduced intensity at zero degrees (nadir) and high intensity at angles away from nadir, as shown in FIG. 2, for example. Such a distribution profile (illustrated in FIG. 2) is often referred as a "batwing" distribution and is more desirable for achieving uniform illumination.

For mobile display applications, such as in smart phones, tablets, and laptop computer screens, it is highly desirable to steer the light energy toward the viewer (nadir direction) so that the display surface luminance can be maximized with minimal energy consumption. Such an optical function is often called "brightness enhancement."

For many lighting applications, it is desirable to minimize the light emitting energy at high angles (i.e., >65 degrees from nadir) to reduce glare that may cause visual discomfort. Such an optical function is often called "glare reduction."

The above-referenced optical functions may be achieved using linear prism microstructures having various prism roof angles. For example, using a common polymer with a refractive index of 1.5, microstructure roof angles between 75 degrees and 90 degrees may transform a Lambertian distribution into a batwing distribution, microstructure roof angles around 90 degrees may achieve optimal brightness enhancement performance, and microstructure roof angles of about 115 degrees may achieve optimal glare reduction.

To further enhance the optical performance of an LED, two layers of prism microstructures that are arranged orthogonal to each other may be used. For example, such an arrangement may be used to transform a Lambertian distribution into batwing distributions in both X and Y directions. Crossing two layers of prism microstructures that are designed for brightness enhancement may further increase brightness by about 50%, and crossing two layers of prism microstructures that are designed for glare reduction may eliminate unwanted light energy at high angles from nadir in both X and Y directions. Although the optical performance of an LED may be enhanced by using two layers of prism microstructures, such arrangements may not be feasible for compact applications due to the thickness of the combination of the layers. It is desirable to enhance the optical performance of an LED with a more compact structure.

SUMMARY

It has been found that optical transmissive prism microstructures that may be fabricated on a light transmissible film in a compact way may be used to perform the desired transformation functions to transform a Lambertian distribution into a light distribution having enhanced brightness, reduced glare in two dimensions, and/or a two dimensional batwing distribution so that small LED light sources may be used in compact applications. Embodiments of the present invention are described below.

According to an aspect of the invention, there is provided a light transmissive substrate for transforming a Lambertian light distribution. The light transmissive substrate includes a base film having a first side and a second side opposite the first side, and a plurality of first microstructures disposed on the first side of the base film. Each of the first microstructures has a first peak defining a first roof angle. The light transmissive substrate includes a plurality of first valleys. Each of the first valleys is defined by a pair of adjacent first microstructures. A filler material is disposed in the plurality of first valleys and defines a substantially planar surface spaced from and substantially parallel to the first side of the base film. A plurality of second microstructures are disposed on the substantially planar surface of the filler material. Each of the second microstructures has a second peak defining a second roof angle. The light transmissive substrate includes a plurality of second valleys. Each of the second valleys is defined by a pair of adjacent second microstructures.

In an embodiment, each of the plurality of first microstructures and the plurality of second microstructures is an elongated microprism having a triangular cross-section.

In an embodiment, the plurality of first microstructures and the plurality of second microstructures are orthogonal to each other.

In an embodiment, the first roof angle is between about 50° and about 70°. In an embodiment, the first roof angle is about 60°.

In an embodiment, the second roof angle is between about 70° and about 90°. In an embodiment, the second roof angle is about 80°.

In an embodiment, the filler material has a refractive index of between about 1.3 and about 1.5. In an embodiment, the refractive index is about 1.3.

In an embodiment, the plurality of first microstructures and the plurality of second microstructures have refractive indices of between about 1.5 and about 1.7. In an embodiment, the refractive indices are about 1.6.

In an embodiment, the second side of the base film is substantially planar.

In an embodiment, the second side of the base film comprises a texture.

According to an aspect of the invention, there is provided a method for manufacturing a light transmissive substrate for transforming a Lambertian light distribution. The method includes creating a plurality of first microstructures and a plurality of first valleys on a first side of a base film. Each of the plurality of first microstructures has a first peak defining a first roof angle, and each of the plurality of first valleys is defined by an adjacent pair of first microstructures. The method includes disposing a filler material in the plurality of first valleys to establish a substantially planar surface spaced from and substantially parallel to the first side of the base film. The method includes creating a plurality of second microstructures and a plurality of second valleys on the substantially planar surface of the filler material. Each of the plurality of second microstructures has a second peak defining a second roof angle, and each of the plurality of second valleys is defined by an adjacent pair of second microstructures.

In an embodiment, the method further includes curing the filler material before creating the plurality of second microstructures and the plurality of second valleys.

In an embodiment, the method further includes texturing the second side of the base film.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The components of the following figures are illustrated to emphasize the general principles of the present disclosure and are not necessarily drawn to scale, although at least one of the figures may be drawn to scale. Reference characters designating corresponding components are repeated as necessary throughout the figures for the sake of consistency and clarity.

FIG. 11B is a top view of the three-dimensional polar chart of FIG. 11A;

DETAILED DESCRIPTION

Embodiments of the present invention provide light transmissive substrates having microstructures that may provide the desired effect of transforming a Lambertian intensity distribution received from a light source, such as an LED, by enhancing the brightness of the light, reducing glare in two dimensions, and/or transforming the distribution into a two dimensional batwing distribution, yet be more compact than light transmissive substrates known in the art.

Figure 3:
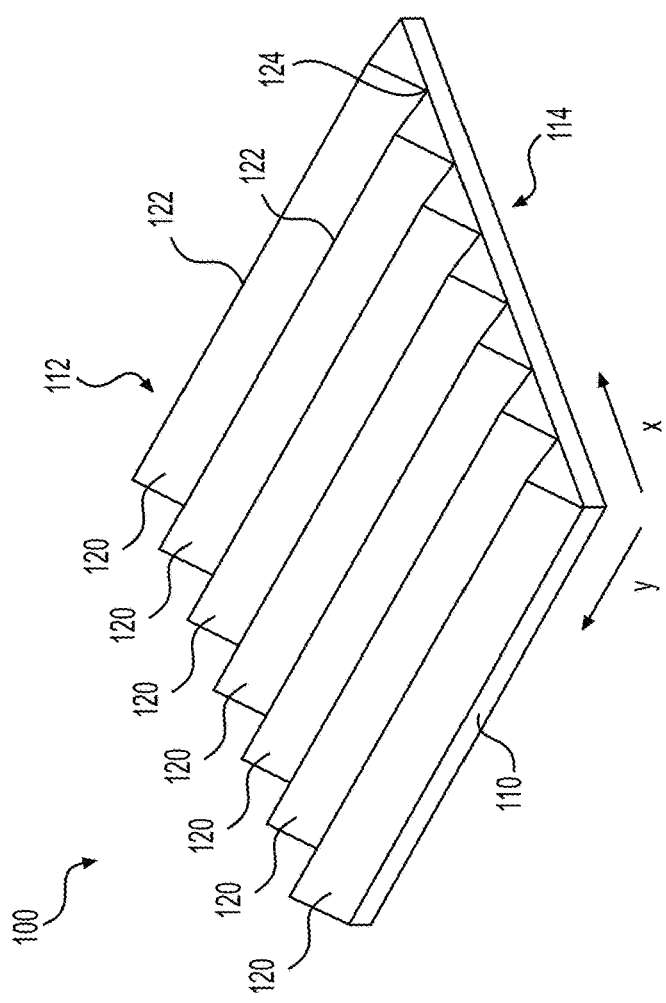
FIG. 3 is an isometric schematic view of a light transmissive substrate with a plurality of microstructures on one side thereof.

FIG. 3 is a schematic illustration of a light transmissive substrate 100 for transforming a Lambertian light distribution. The substrate 100 includes a film 110 and a plurality of microstructures 120 disposed on one side of the film 110 so as to define a first surface 112 of the light transmissive substrate 100. A second surface 114 of the substrate 100, opposite the first surface 112, is defined by a side of the film 110 that is opposite the plurality of microstructures 120. The plurality of microstructures 120 define a plurality of peaks 122 and a plurality of valleys 124, with a single peak alternating with a single valley in a first direction X, as illustrated.

Figure 1:
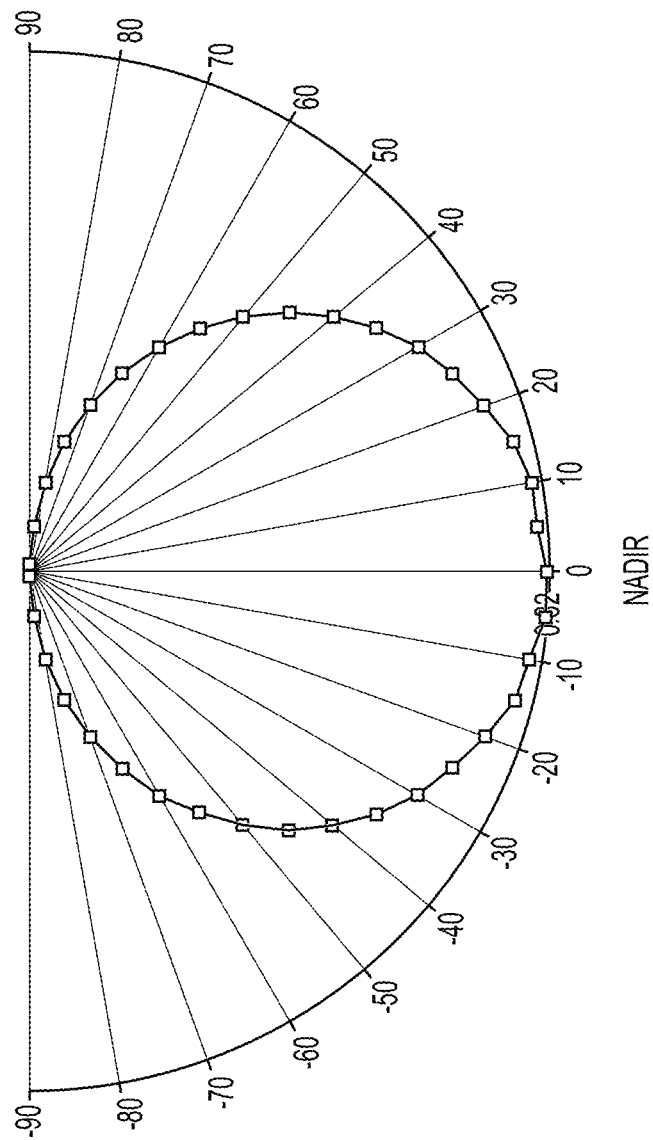
FIG. 1 is a two-dimensional polar chart of a Lambertian intensity distribution.
Figure 2:
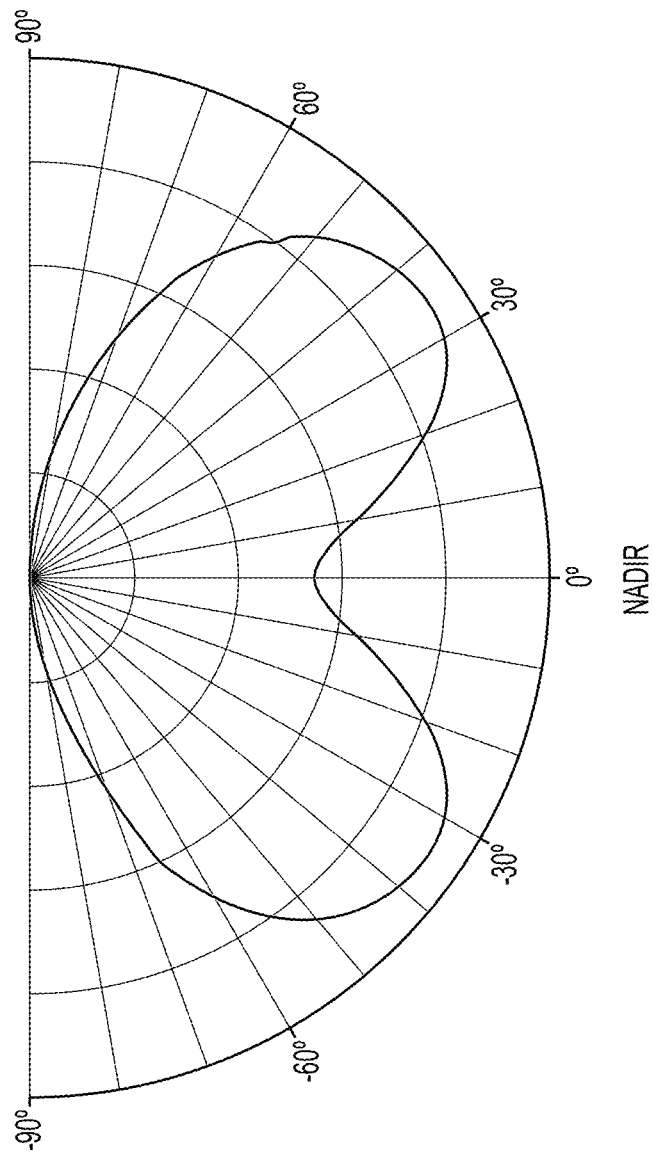
FIG. 2 is a two-dimensional polar chart of a batwing-type intensity distribution.
Figure 4:
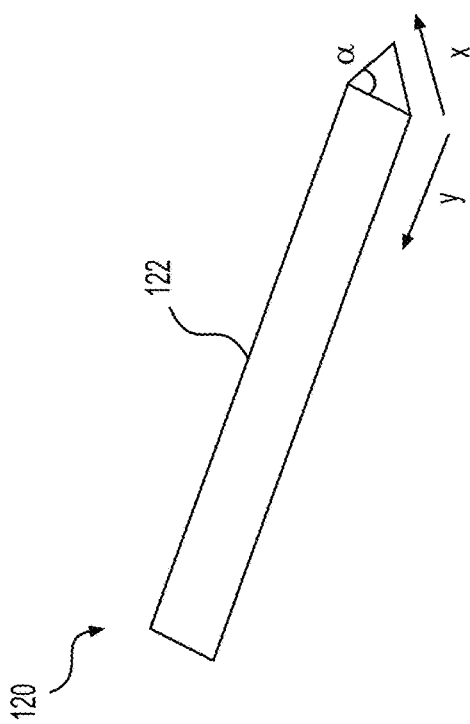
FIG. 4 is an isometric schematic view of a single microstructure according to embodiments of the invention.

FIG. 4 illustrates a single microstructure 120 in further detail. As illustrated, the microstructure 120 is in the form of an elongated microprism having a triangular cross-section and extending in a second direction Y, which may be orthogonal to the first direction X. The peak 122 of the microstructure 120 has a so-called roof angle or vertex α that may be, for example, about 90 degrees. As discussed in further detail below, the roof angle of the microstructure may be adjusted to achieve a desired effect.

Figure 5:
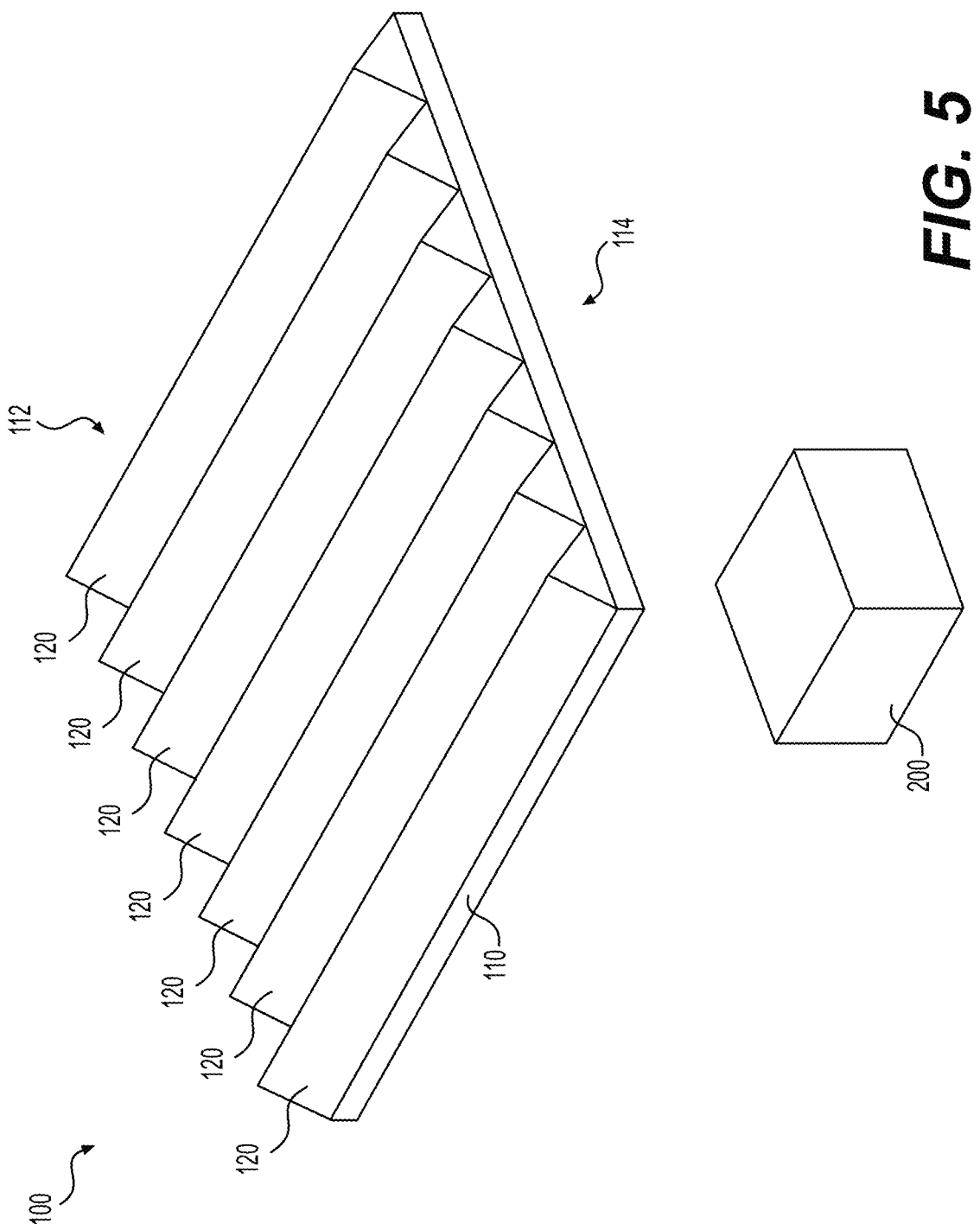
FIG. 5 is an isometric schematic view of an LED light source and the light transmissive substrate of FIG. 3 with the microstructures facing away from the LED light source.

FIG. 5 schematically illustrates the light transmissive substrate 100 with a light source 200, which may be a light emitting diode (LED) or a plurality of LEDs. In the orientation illustrated in FIG. 5, the second surface 114 of the light transmissive substrate 100 faces the light source 200 so that the second surface 114 receives light being emitted from the light source 200. The light passes through the film 110 and the plurality of microstructures 120 and exits the first surface 112 of the light transmissive substrate 100.

Figure 6:
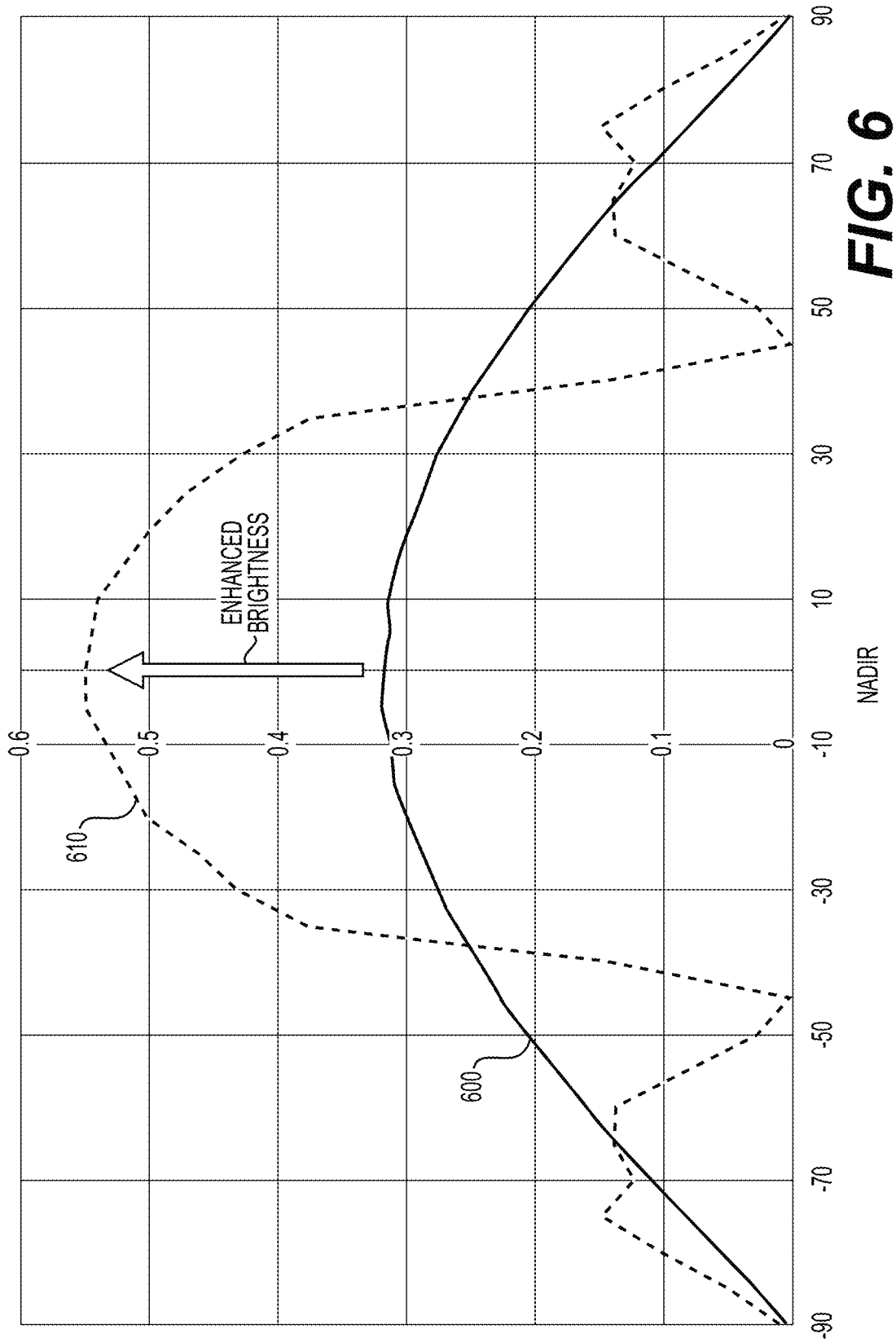
FIG. 6 is a two-dimensional polar chart of an intensity distribution showing on-axis (0°) brightness enhancement provided by the embodiment of FIG. 5 with the microstructures having roof angles of 90 degrees.

FIG. 6 illustrates how an embodiment illustrated in FIG. 5 may be used to enhance the brightness of light emitted by the light source 200. For example, with the plurality of microstructures 120 having roof angles α of about 90 degrees, the light transmissive substrate 100 transforms a Lambertian distribution 600 emitted by the light source 200 into a distribution 610 having brightness enhancement at the nadir.

Figure 7:
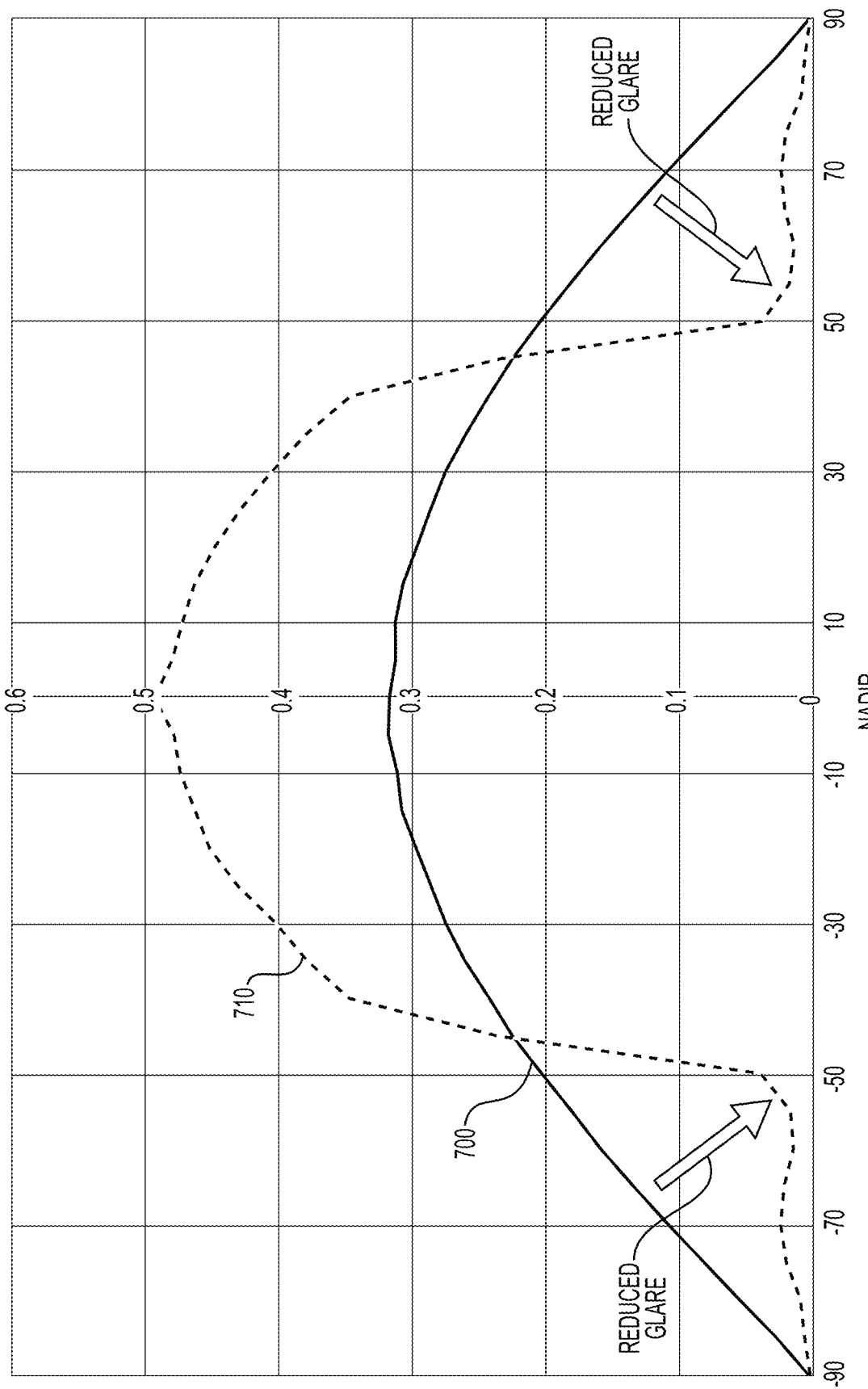
FIG. 7 is a two-dimensional polar chart of an intensity distribution showing glare reduction at angles away from nadir provided by the embodiment of FIG. 5 with the microstructures having roof angles of between 115 degrees and 120 degrees.

FIG. 7 illustrates how an embodiment illustrated in FIG. 5 may be used to reduce glare of light emitted by the light source 200. For example, with the plurality of microstructures 120 having roof angles α of about 115-120 degrees, the light transmissive substrate 100 transforms a Lambertian distribution 700 emitted by the light source 200 into a distribution 710 having glare reduction at angles greater than 50 degrees from the nadir.

Figure 8:
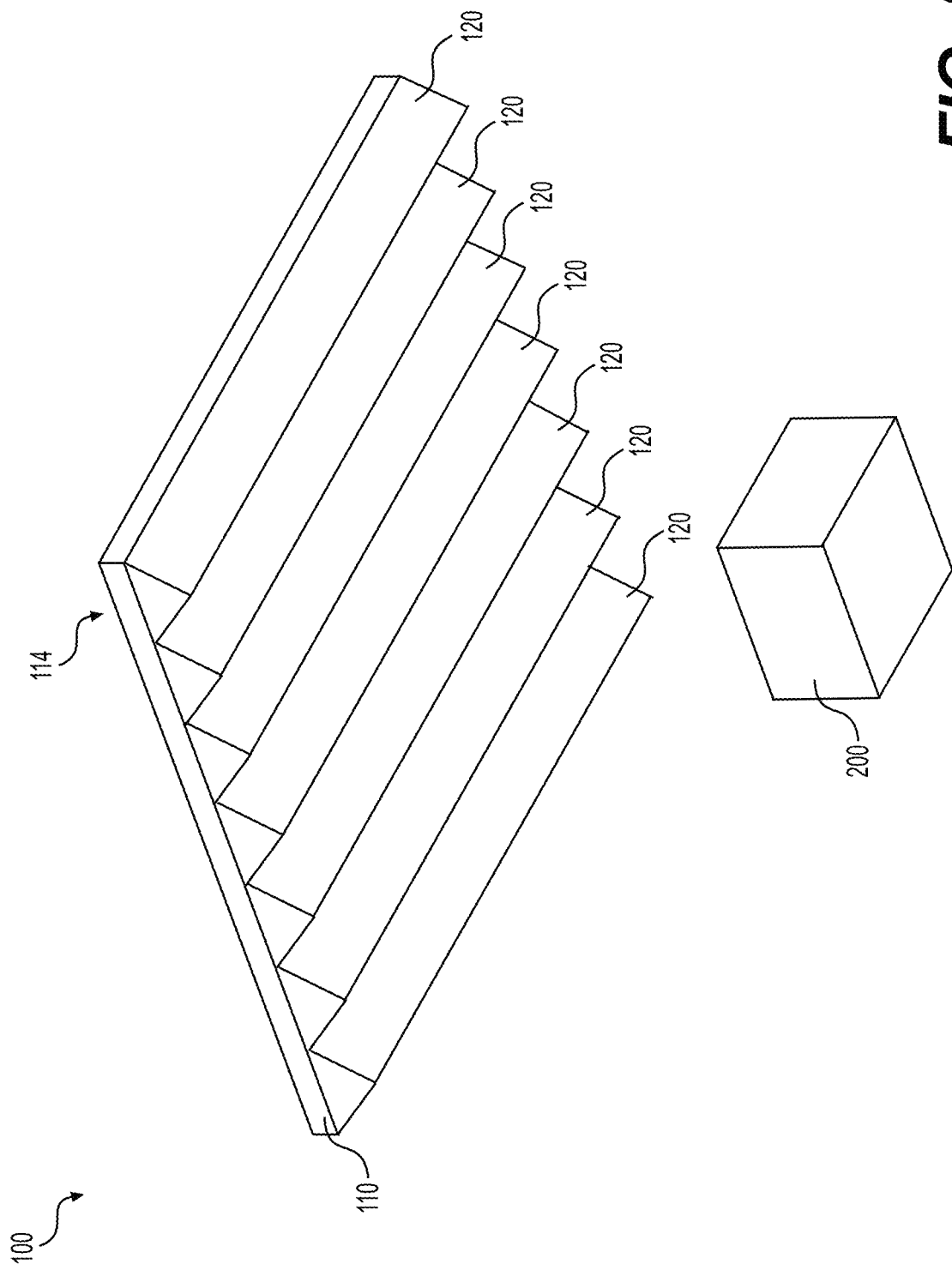
FIG. 8 is an isometric schematic view of an LED light source and the light transmissive substrate of FIG. 3 with the microstructures facing the LED light source.

FIG. 8 schematically illustrates the light transmissive substrate 100 and the light source 200, with the second surface 114 of the light transmissive substrate 100 facing away from the light source 200 so that the plurality of microstructures 120 receive light being emitted from the light source 200. The light passes through the plurality of microstructures 120 and the film 110 and exits the second surface 114 of the light transmissive substrate 100.

Figure 9:
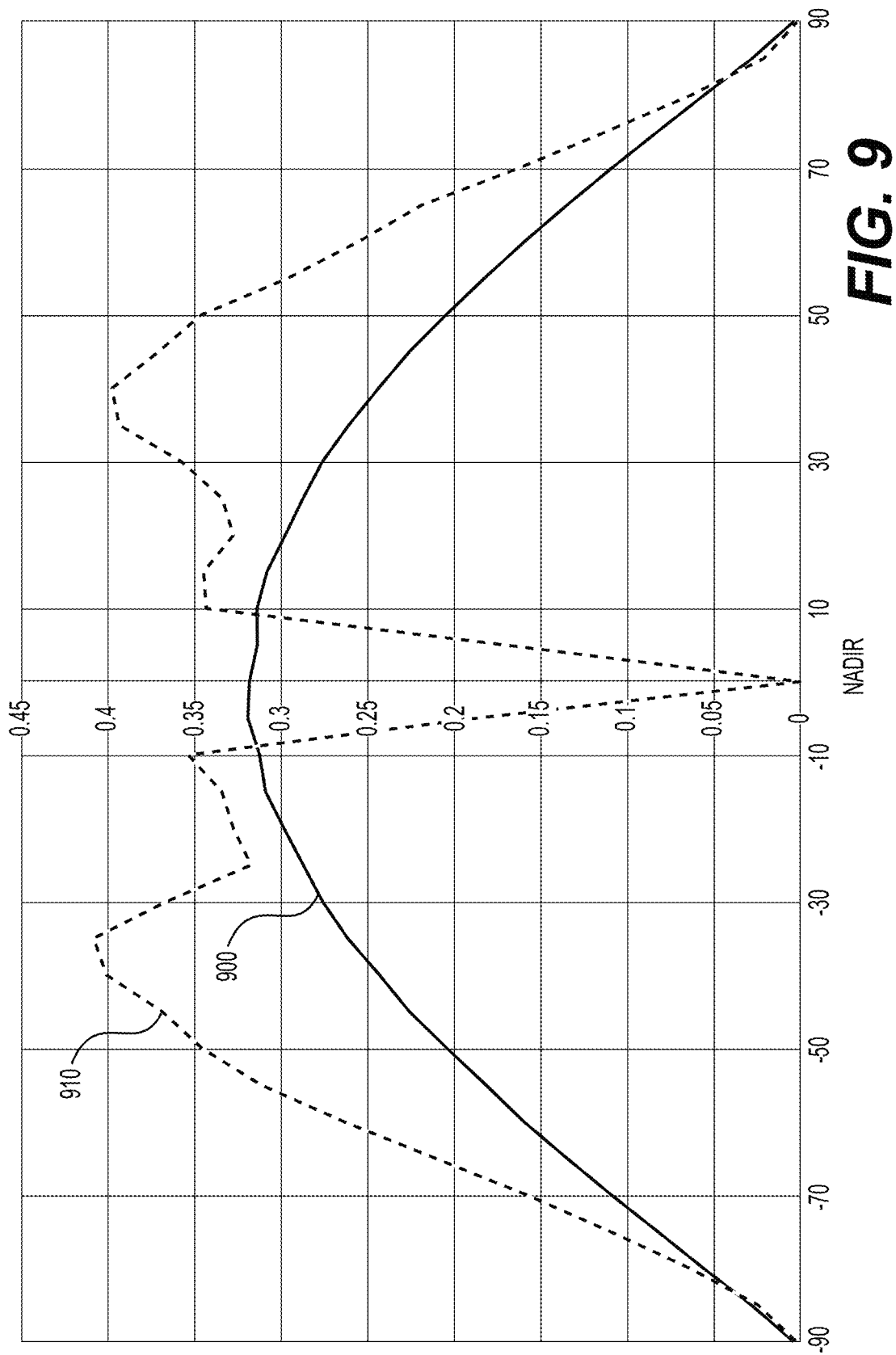
FIG. 9 is a two-dimensional polar chart of an intensity distribution showing a beam splitting transformation provided by the embodiment of FIG. 8 with the microstructures having roof angles of between 70 degrees and 100 degrees.

FIG. 9 illustrates how an embodiment illustrated in FIG. 8 may be used as a light beam splitter and to create a batwing distribution. For example, with the plurality of microstructures having roof angles α of about 70-100 degrees and facing the light source 200, the light transmissive substrate 100 transforms a Lambertian distribution 900 emitted by the light source 200 into a distribution 910 having about zero intensity at the nadir and maximum intensity at about ±40 degrees from the nadir.

Figure 10:
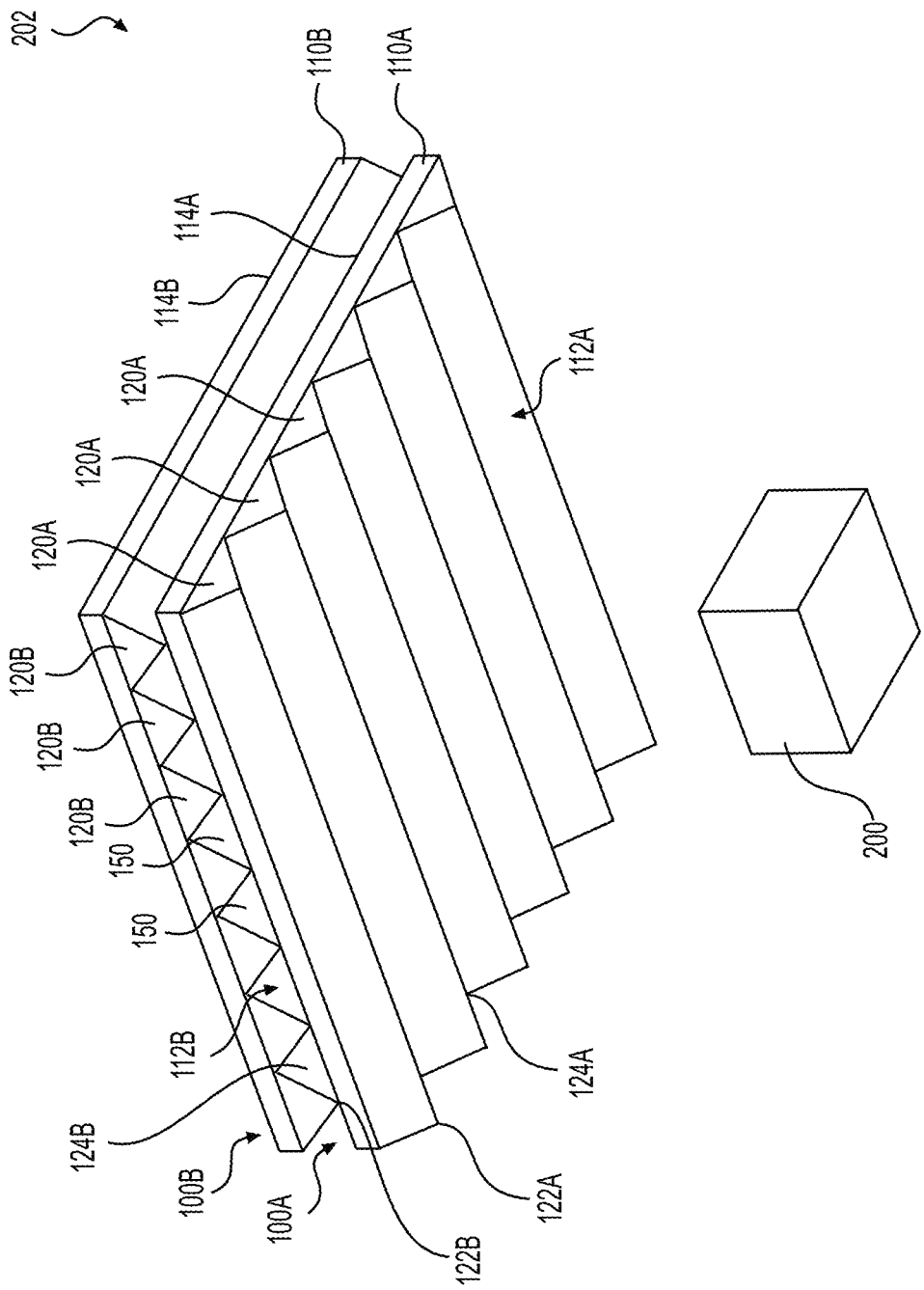
FIG. 10 is an isometric schematic view of an LED light source and a pair of light transmissive substrates of FIG. 3 with the microstructures oriented 90 degrees from each other and facing the LED light source.

FIG. 10 illustrates an embodiment of a light transmissive substrate 202 that includes two light transmissive substrates 100A, 100B, each of which have the same structure as the light transmissive substrate 100 illustrated in FIG. 3. As illustrated, each of the light transmissive substrates 100A, 100B has a film 110A, 110B and a plurality of microstructures 120A, 120B on one side of the film 110A, 110B, respectively. The light transmissive substrates 100A, 100B are oriented relative to each other such that the plurality of microstructures 120A, 120B are oriented orthogonally (i.e., perpendicularly) to each other. In the embodiment illustrated in FIG. 10, the light transmissive substrates 110A, 110B are placed above the light source 200 that outputs light in a Lambertian distribution such that first surfaces 112A, 112B of the light transmissive substrates 100A, 100B are oriented towards the light source 200 and second surfaces 114A, 114B of the substrates 100A, 100B are oriented away from the light source 200. As illustrated, the film 110A contacts the peaks 122B of the plurality of microstructures 120B to define air gaps 150 in the valleys 124B of the plurality of microstructures 120B. Light emitting from the light source 200 enters the first substrate 100A closest to the light source 200 via its first surface 112A, exits the first substrate 100A at its second surface 114A, enters the second substrate 100B at its first surface 112B, and exits the second substrate 100B at its second surface 114B. The different orientations of the microstructures 120A, 120B (i.e., being substantially perpendicular to each other) will cause the light to bend and spread in two different directions and result in a net spread that is stronger and in a different direction relative to the X and Y axes than if only one of the light transmissive substrates 100A, 100B is used (as described above). Because the air in the air gaps 150 has a refractive index 1.0 and is different than the refractive index of the materials used to create the microstructures 120A, 120B, additional enhancements to the light passing the substrate may also be achieved, but at a lower transmission efficiency.

Figure 11A:
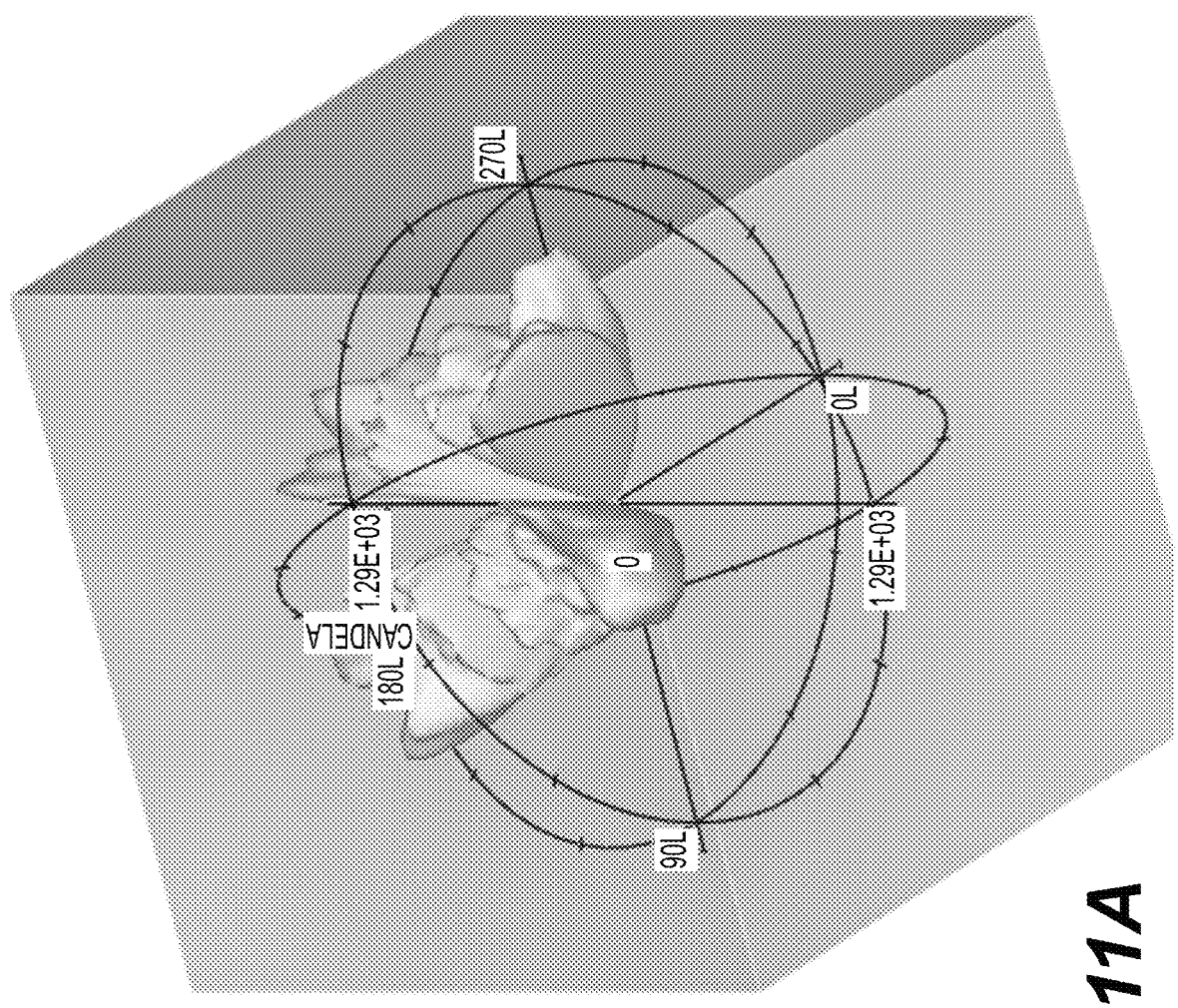
FIG. 11A is an isometric view of a transformed batwing intensity distribution, three-dimensional polar chart for the embodiment of FIG. 10 having microstructures with roof angles of 90 degrees.
Figure 11C:
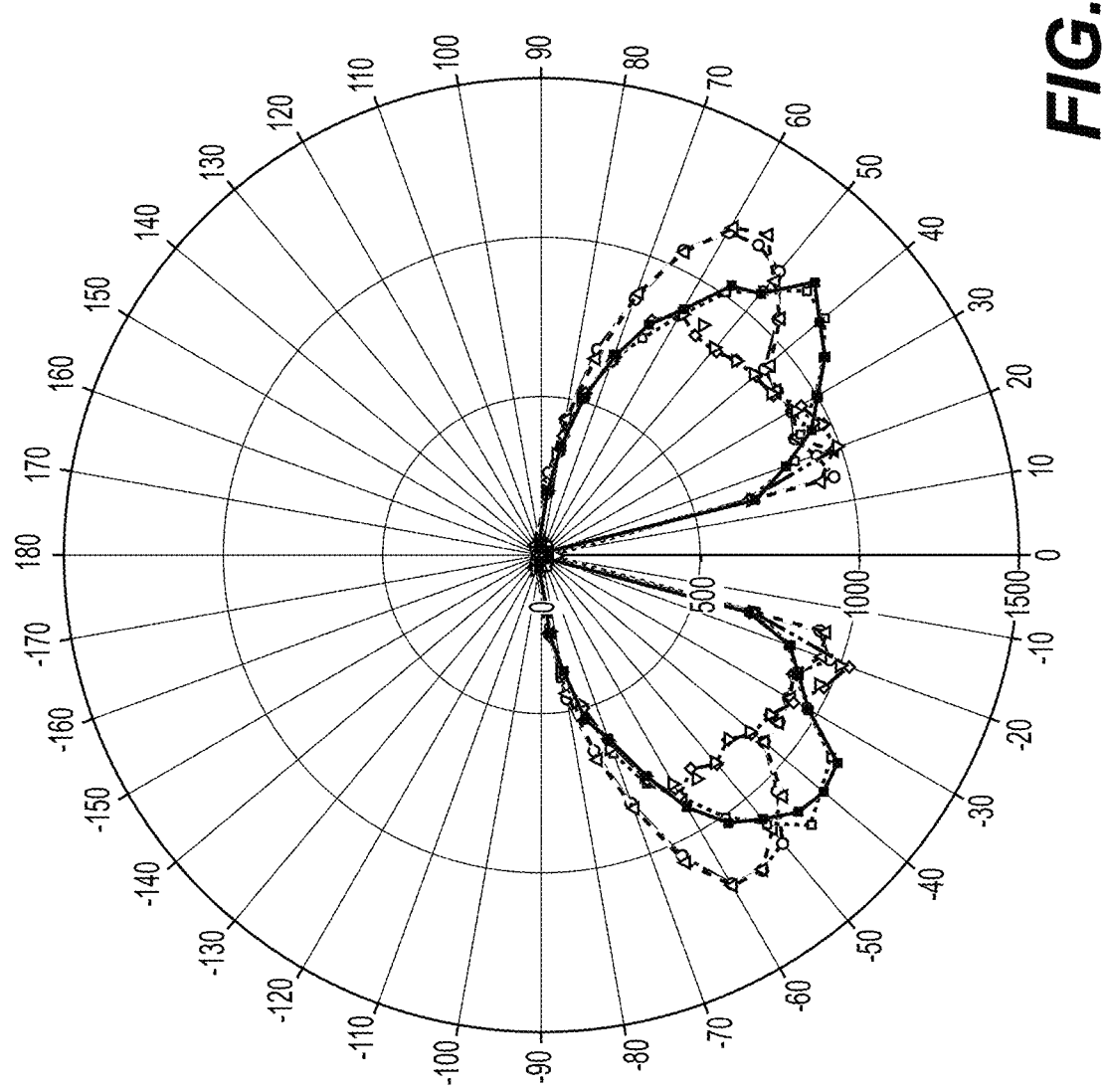
FIG. 11C is a two-dimensional polar chart of the transformed batwing intensity distribution for the embodiment of FIG. 10 having microstructures with roof angles of 90 degrees.

FIGS. 11A-11C illustrate three dimensional and two-dimensional representations of the light distribution provided by the combination of the two light transmissive substrates 100A, 110B having a refractive index of 1.5 and arranged as illustrated in FIG. 10. As illustrated, light energy is not only steered away from the 0 degree (nadir) emitting direction, but also pushed toward four directions approximately 45 degrees from the primary X and Y axes as shown in FIGS. 11A and 11B. Along those directions, light typically travels the longest path length reaching the target area where stronger intensity is desired. Such a distribution may be desirable when there are multiple light sources arranged in a substantially square array, such as in back-lit displays or large area lighting applications (such as when lighting a warehouse). FIG. 11C is a 2D polar plot of the light intensity distributions represented by FIGS. 11A and 11B.

Figure 11D:
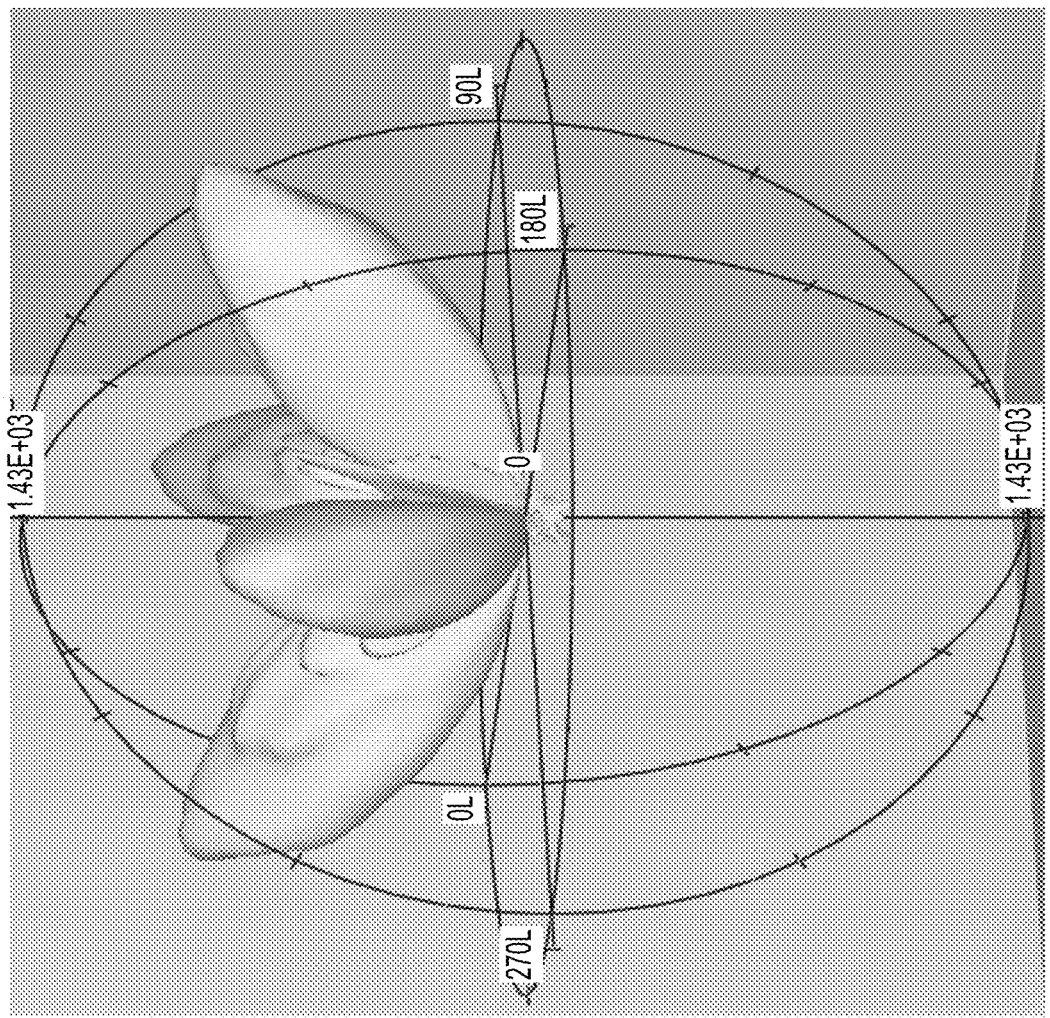
FIG. 11D is an isometric view of a transformed batwing intensity distribution, three-dimensional polar chart for the embodiment of FIG. 10 having microstructures with roof angles of 85 degrees.
Figure 11E:
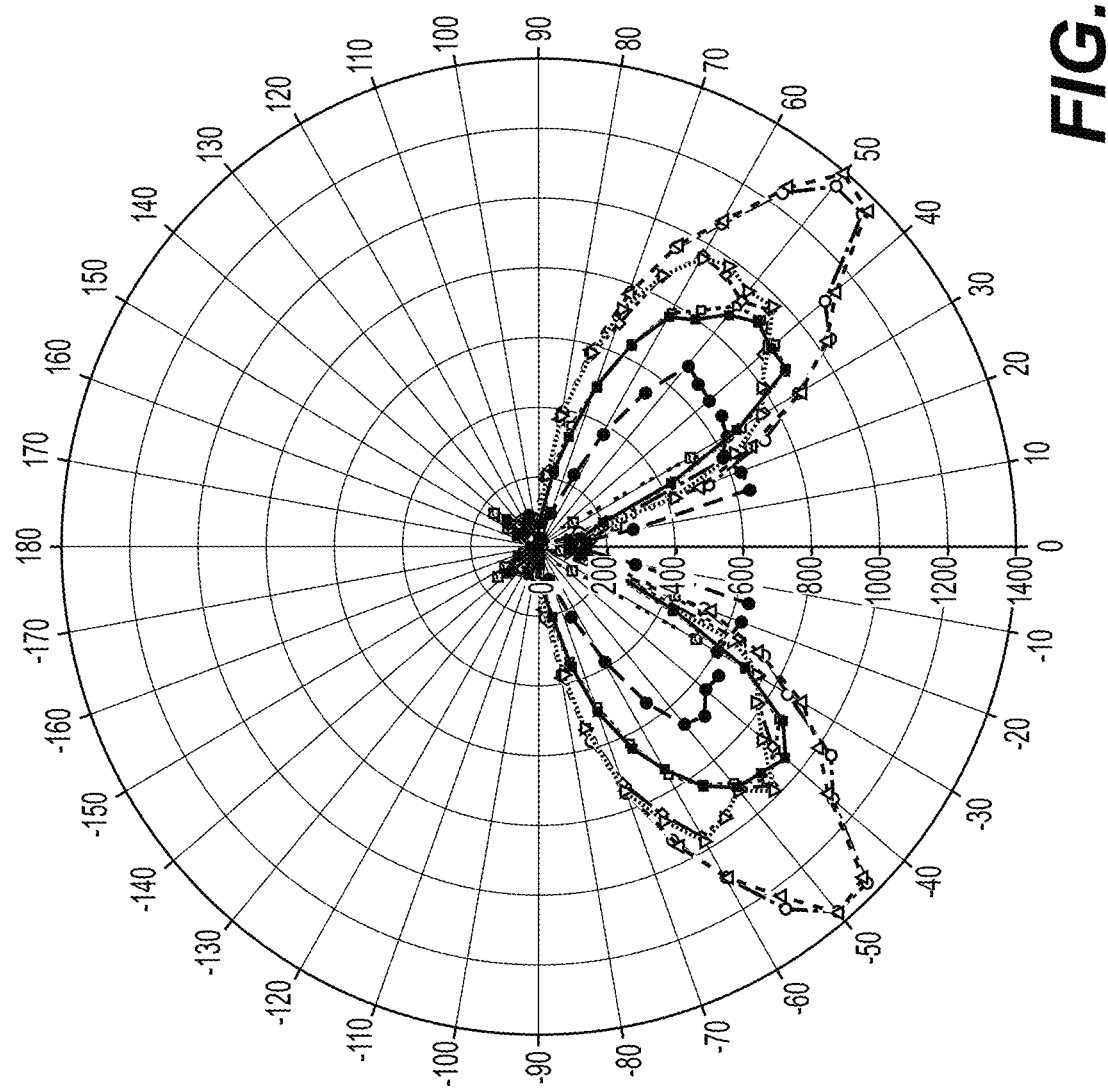
FIG. 11E is a two-dimensional polar chart of the transformed batwing intensity distribution for the embodiment of FIG. 10 with the microstructures having a refractive index of 1.5 and roof angles of 85 degrees.
Figure 11F:
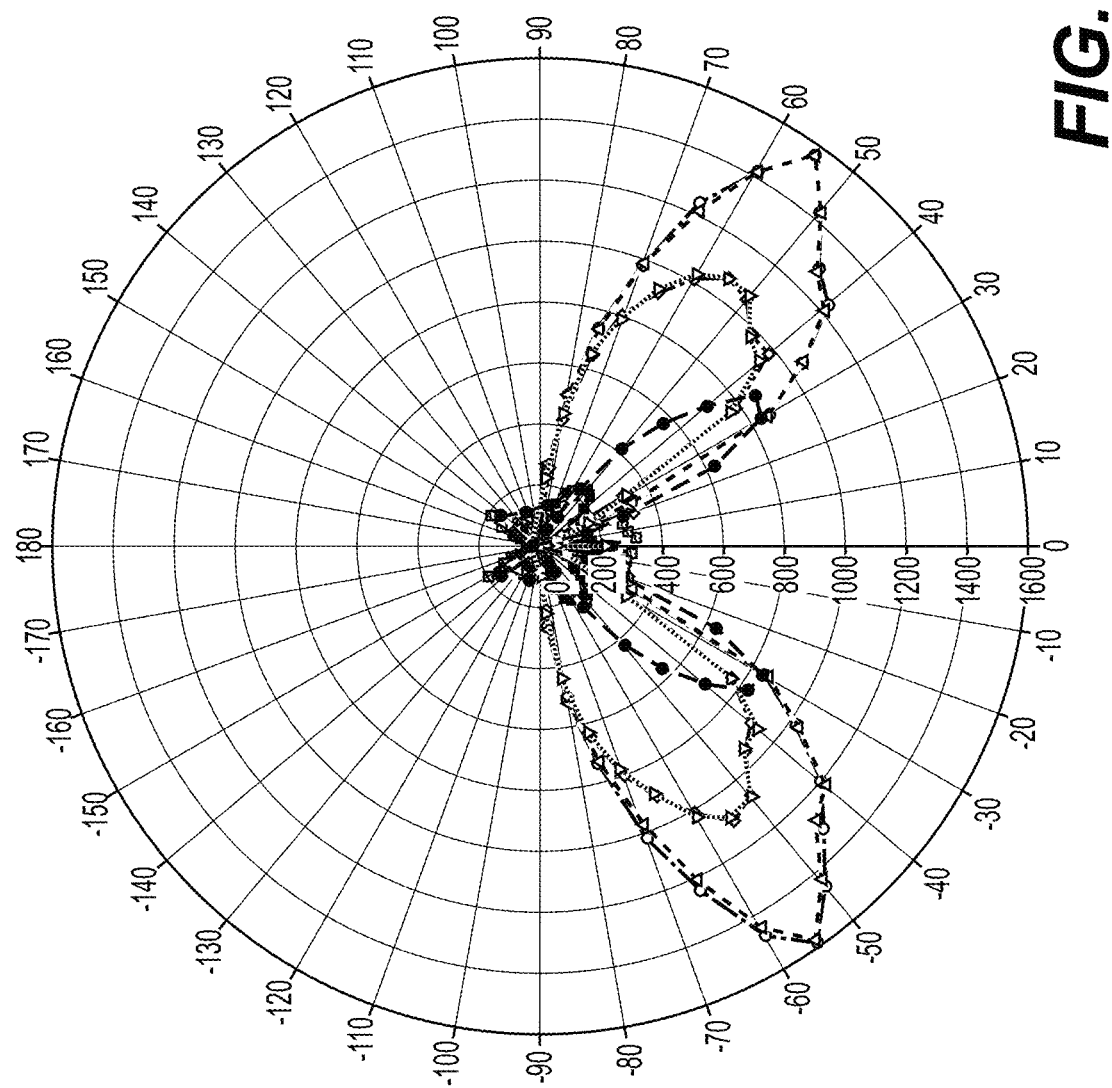
FIG. 11F is a two-dimensional polar chart of the transformed batwing intensity distribution for the embodiment of FIG. 10 with the microstructures having a refractive index of 1.6 and roof angles of 85 degrees.

The roof angles α of the microstructures 120A, 120B of both substrates 100A, 100B may be adjusted to optimize the output distribution. For example, in an embodiment, the roof angle α of the microstructures 120A, 120B on the substrates 100A, 100B may be 85 degrees. FIG. 11D illustrates a three dimensional representation of the light distribution provided by the combination of the two light transmissive substrates 100A, 100B having a refractive index of 1.5 with the microstructures 120A, 120B having roof angles of 85 degrees, and arranged as illustrated in FIG. 10. FIG. 11E is a 2D polar plot of the light intensity distribution represented by FIG. 11D. FIG. 11F is a 2D polar plot of the light intensity distribution provided by the combination of the two light transmissive substrates 100A, 100B having a refractive index of 1.6 with the microstructures 120A, 120B having roof angles of 85 degrees, and arranged as illustrated in FIG. 10. A comparison of FIGS. 11E and 11F shows the influence that the refractive index of the light transmissive substrates 100A, 100B has on the batwing spreading performance of the substrates 100A, 100B.

In addition to the 2D batwing distributions provided by the embodiment of FIG. 10, the two light transmissive substrates 100A, 100B also provide brightness enhancement and glare reduction in two dimensions, as compared to the single substrate 100 described above, but with potential drawbacks of increased thickness and manufacturing costs, as well as low transmission efficiency due to the air gaps 150 between the two substrates 100A, 100B. It is desirable to have the benefits provided by the embodiment of FIG. 10, but without the potential drawbacks or at least a lessening of the potential drawbacks.

Figure 12:
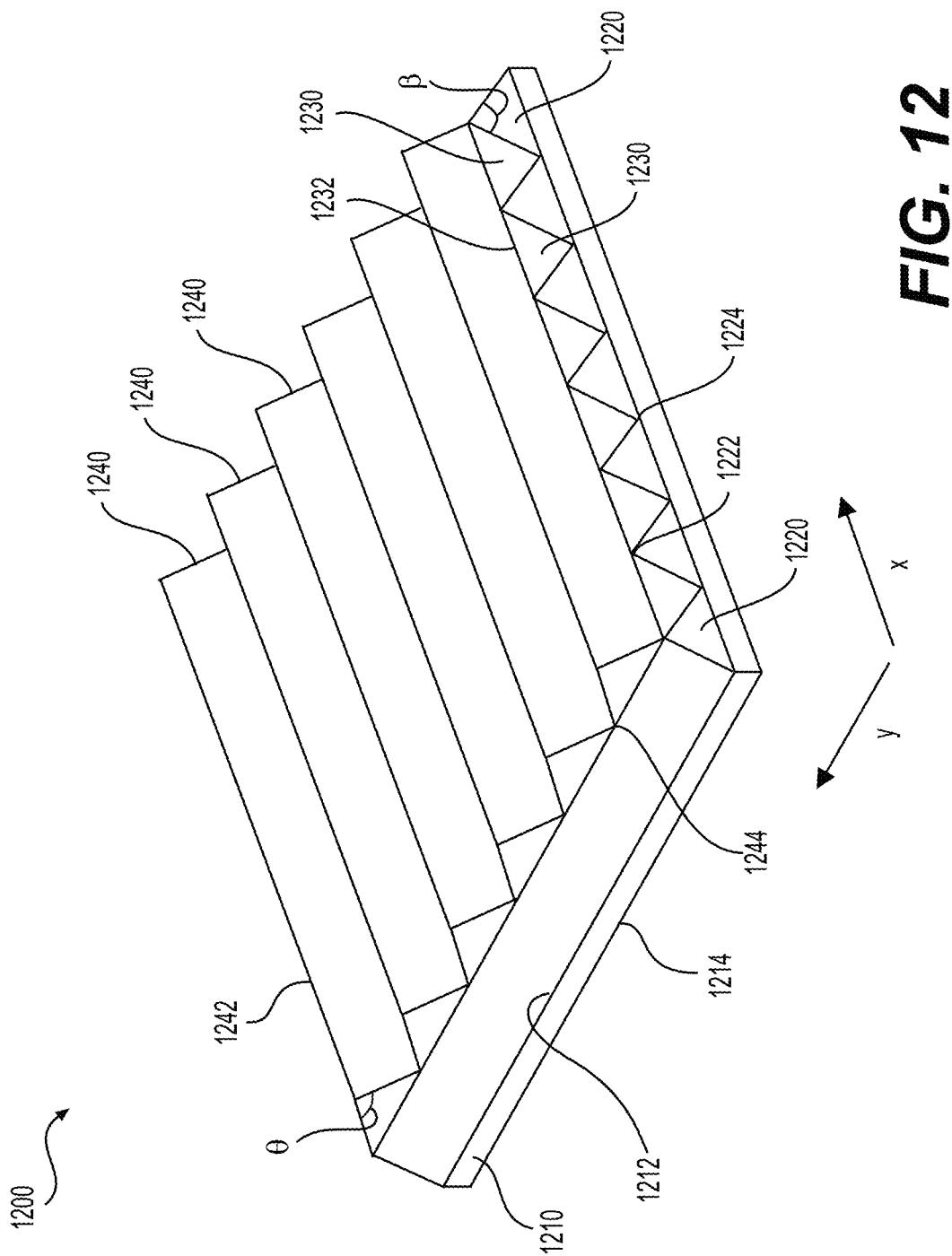
FIG. 12 is an isometric schematic view of a light transmissive substrate in accordance with an embodiment of the invention.
Figure 13:
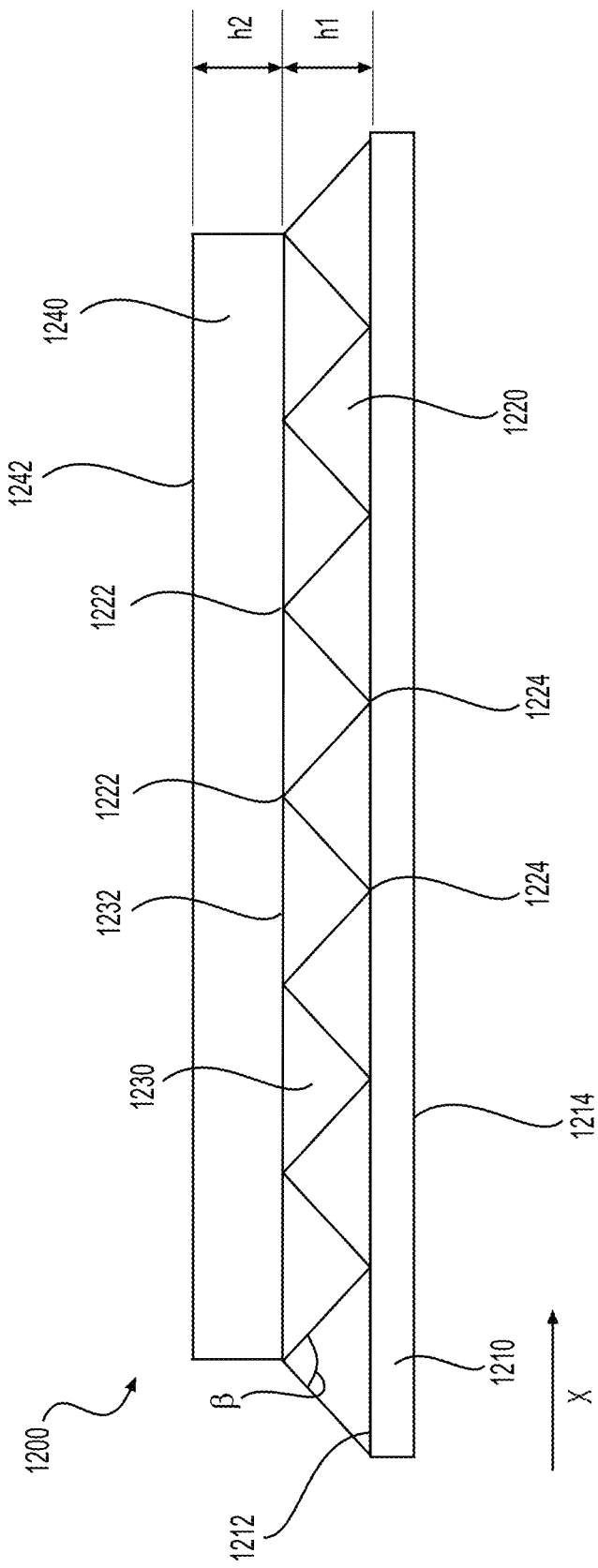
FIG. 13 is a schematic view of one side of the light transmissive substrate of FIG. 12.
Figure 14:
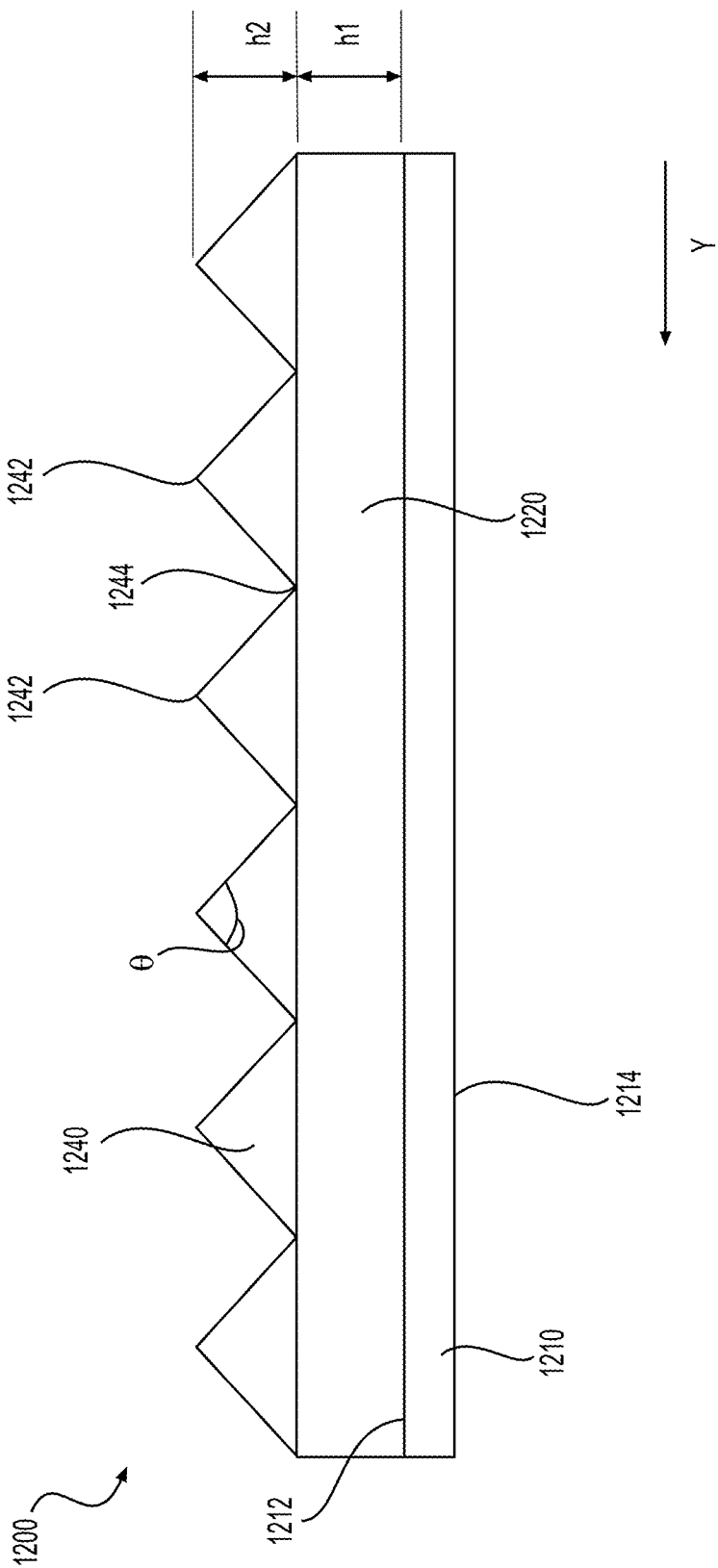
FIG. 14 is a schematic view of another side the light transmissive substrate of FIG. 13 that is orthogonal to the side illustrated in FIG. 13.

FIGS. 12, 13 and 14 illustrate a light transmissive substrate 1200 according to embodiments of the invention. As illustrated, the light transmissive substrate 1200 includes a base film 1210 having a first side 1212 and a second side 1214, and a plurality of first microstructures 1220 disposed on the first side 1212 of the base film 1210. Each of the plurality of first microstructures 1220 may be an elongated microprism having the general shape illustrated in FIG. 4. The plurality of first microstructures 1220 have a plurality of first peaks 1222, with each first peak defining a first roof angle $\beta$, and a plurality of first valleys 1224 that alternate between the first peaks 1222, as illustrated. In an embodiment, the first roof angle $\beta$ may be between about 50 degrees and about 70 degrees. In an embodiment, the first roof angle $\beta$ may be about 60 degrees. In an embodiment, the height $h1$ of the first microstructures 1220 may be in the range of about 10 micrometers to about 50 micrometers.

A filler material 1230 is disposed in the plurality of first valleys 1224 and defines a substantially planar surface 1232, as illustrated in FIG. 13. In the illustrated embodiment, the substantially planar surface coincides with a plane that includes tips of the plurality of first peaks 1222. In an embodiment, the substantially planar surface of the filler material may be spaced from and above the plane that includes tips of the plurality of first peaks 1222. In an embodiment, the filler material 1230 may not completely fill the plurality of valleys 1224 so that small air gaps are present in desired locations. The illustrated embodiment is not intended to be limiting in any way.

The light transmissive substrate 1200 also includes a plurality of second microstructures 1240 disposed on the substantially planar surface 1232 of the filler material 1230 so as to create vertically integrated microstructures. Each of the plurality of second microstructures 1240 may be an elongated microprism having the general shape illustrated in FIG. 4. As illustrated by FIGS. 12 and 14, the plurality of second microstructures 1240 include a plurality of second peaks 1242, with each second peak defining a second roof angle $\theta$, and a plurality of second valleys 1244 that alternate between the second peaks 1242, as illustrated. In an embodiment, the second roof angle $\theta$ may be between about 70 degrees and about 90 degrees. In an embodiment, the second roof angle $\theta$ may be about 80 degrees. In an embodiment, the height $h2$ of the second microstructures 1240 may be in the range of about 10 micrometers to about 50 micrometers.

The light transmissive structures according to embodiments described herein may be created using many techniques known in the art. For example, in an embodiment, the shape of the microstructures may be cast onto a substrate using a suitable master mold, and thermally-curing polymer or ultraviolet (UV) light curing polymer, or the shape may be impressed into a thermoplastic substrate through compression molding or other molding, or may be created at the same time as the substrate using extrusion-embossing or injection molding. The microstructures may be produced by replicating a master. For example, an optical diffuser may be made by replication of a master containing the desired shapes as described in U.S. Pat. No. 7,190,387 B2 to Rinehart et al., entitled "Systems And Methods for Fabricating Optical Microstructures Using a Cylindrical Platform and a Rastered Radiation Beam"; U.S. Pat. No. 7,867,695 B2 to Freese et al., entitled "Methods for Mastering Microstructures Through a Substrate Using Negative Photoresist"; and/or U.S. Pat. No. 7,192,692 B2 to Wood et al., entitled "Methods for Fabricating Microstructures by Imaging a Radiation Sensitive Layer Sandwiched Between Outer Layers", assigned to the assignee of the present invention, the disclosures of all of which are incorporated herein by reference in their entireties as if set forth fully herein. The masters themselves may be fabricated using laser scanning techniques described in these patents, and may also be replicated to provide diffusers using replicating techniques described in these patents.

In an embodiment, laser holography, known in the art, may be used to create a holographic pattern that creates the desired microstructures in a photosensitive material. In an embodiment, projection or contact photolithography, such as used in semiconductor, display, circuit board, and other common technologies known in the art, may be used to expose the microstructures into a photosensitive material. In an embodiment, laser ablation, either using a mask or using a focused and modulated laser beam, may be used to create the microstructures including the indicia in a material. In an embodiment, micromachining (also known as diamond machining), known in the art, may be used to create the desired microstructures from a solid material. In an embodiment, additive manufacturing (also known as 3D printing), known in the art, may be used to create the desired microstructure in a solid material.

The filler material 1230 may be any suitable material that may be applied to the microstructures 1220 to fill in the valleys 1224 between adjacent microstructures 1220 and have a desirable refractive index with respect to the refractive indices of the microstructures 1220, 1240. For example, the filler material 1230 may be in the form of an adhesive and/or UV curable polymer that flows when being applied to the microstructures 1220 and may be solidified thereafter.

Figure 15:
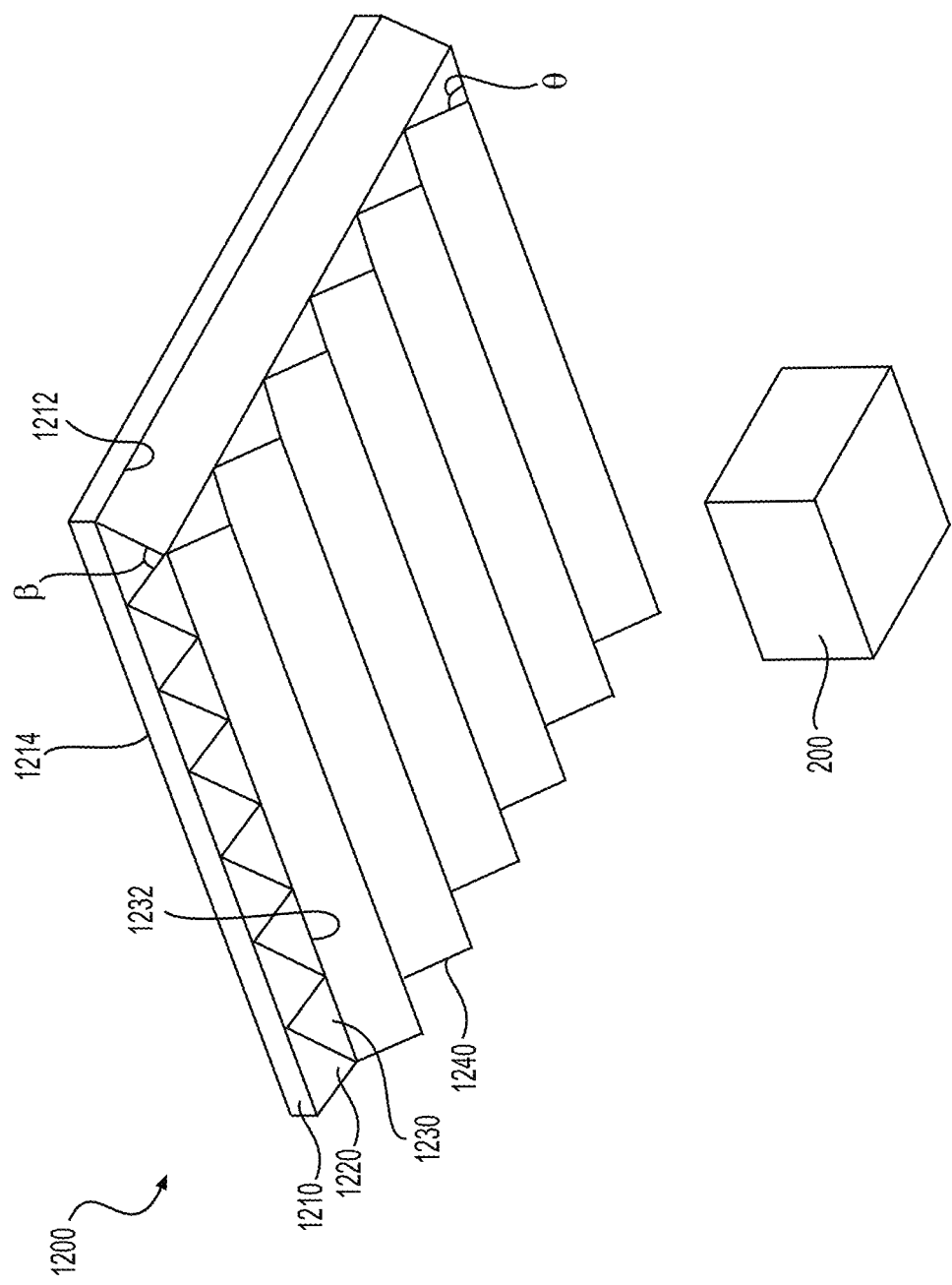
FIG. 15 is an isometric schematic view of an LED light source and a light transmissive substrate of FIG. 12 with the microstructures facing the LED light source.
Figure 16A:
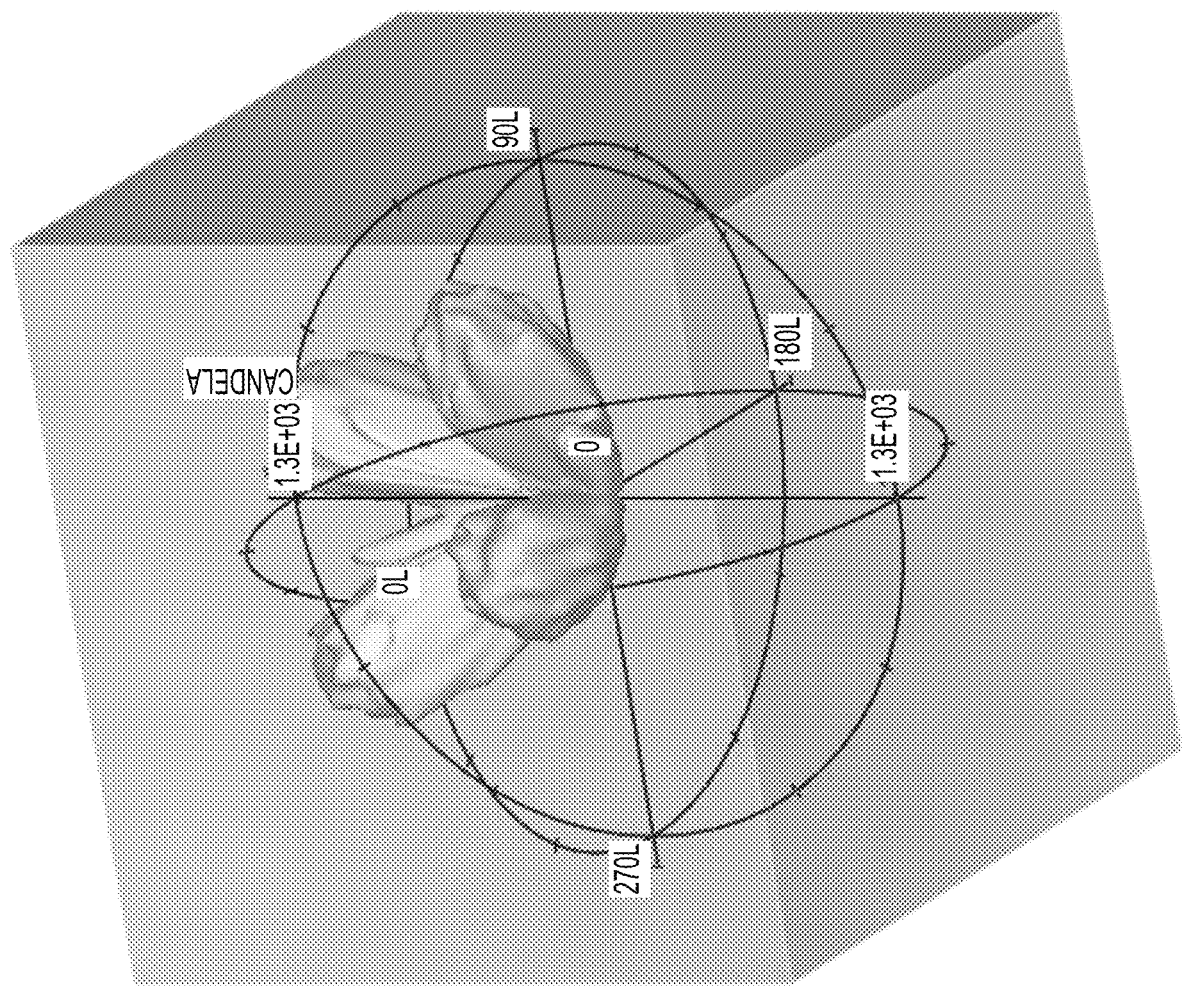
FIG. 16A is an isometric view of a transformed batwing intensity distribution, three-dimensional polar chart for an embodiment of FIG. 15.
Figure 16B:
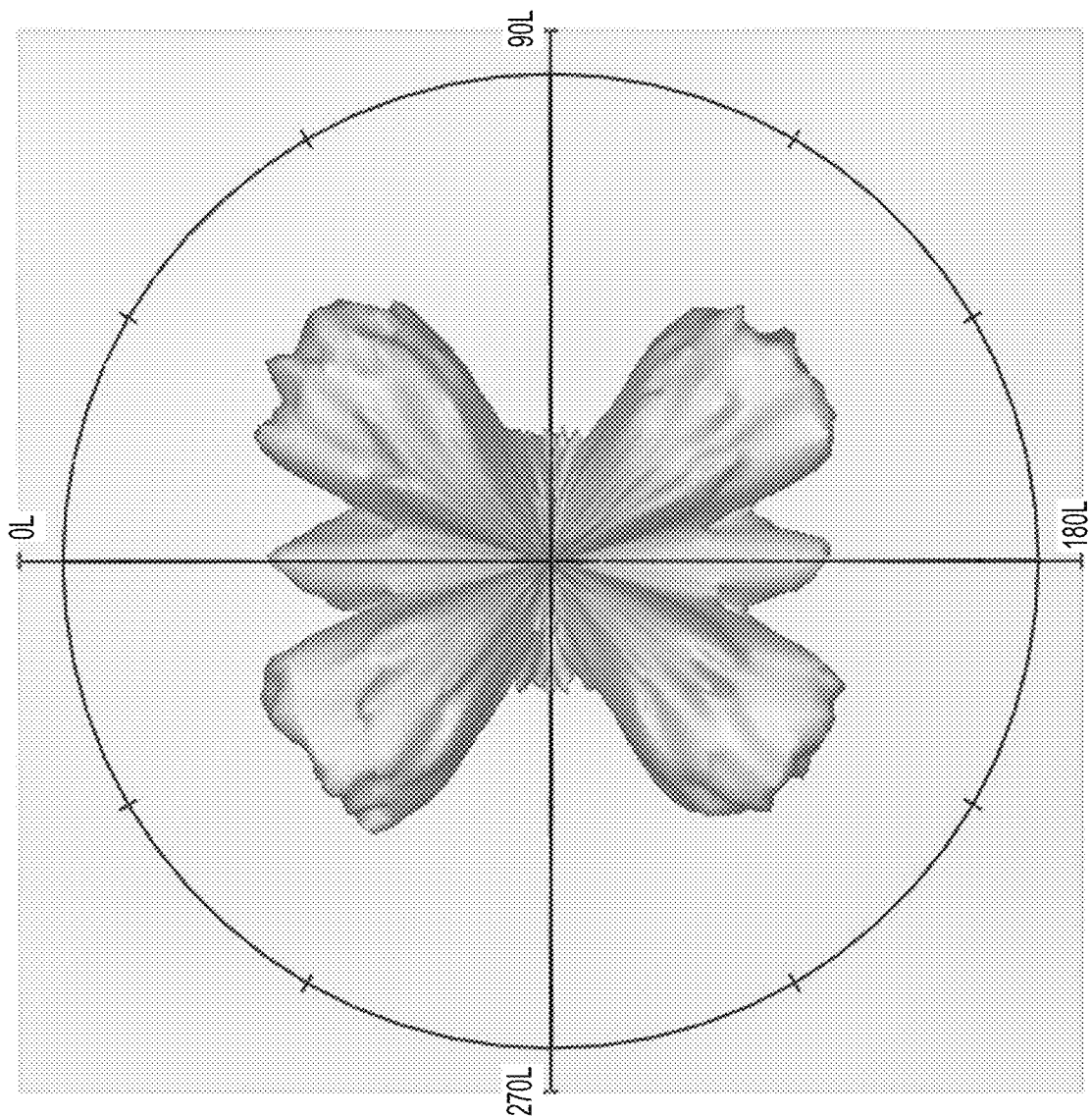
FIG. 16B is a top view of the three-dimensional polar chart of FIG. 16A.
Figure 16C:
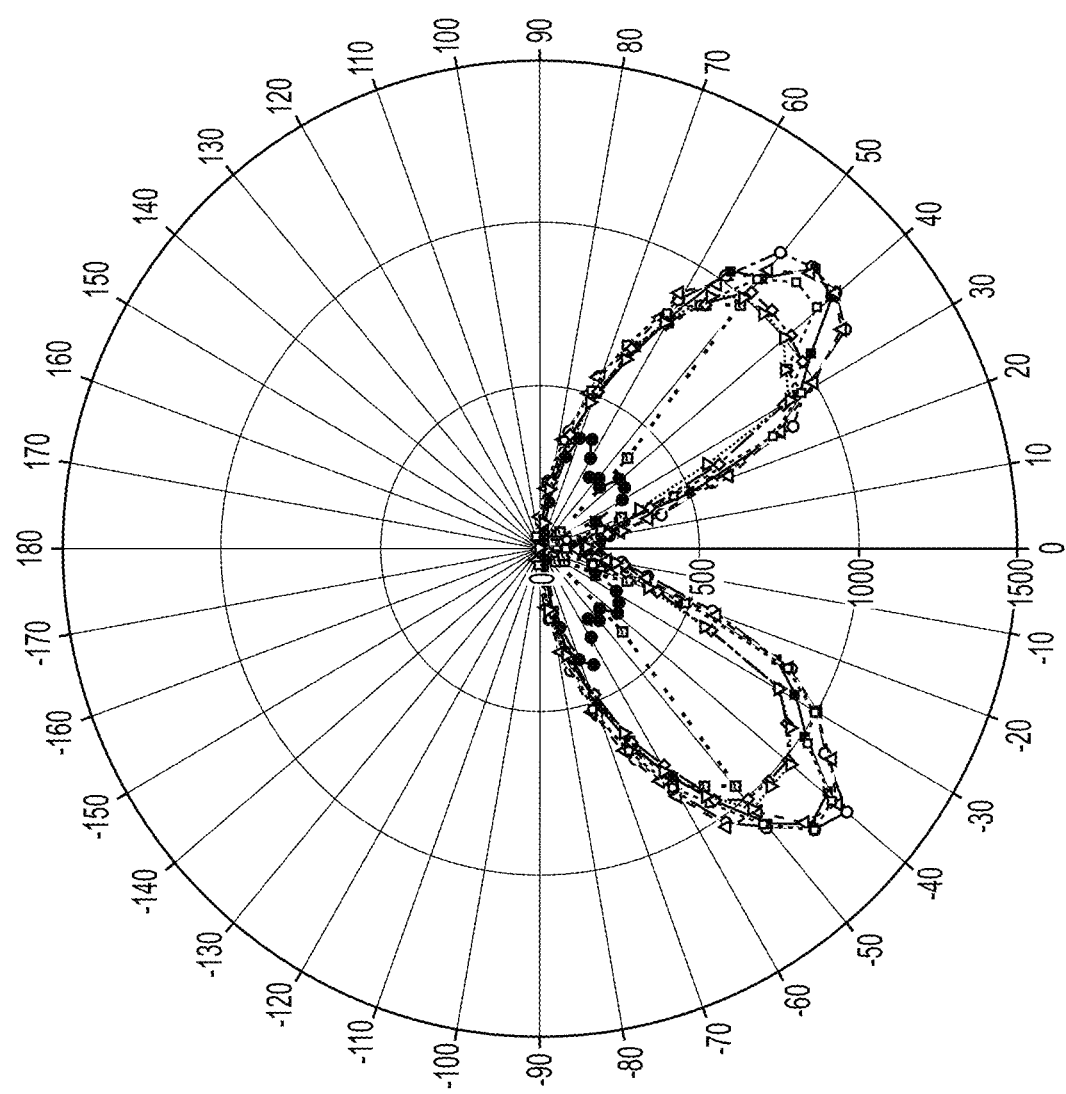
FIG. 16C is a two-dimensional polar chart of the transformed batwing intensity distribution for an embodiment of FIG. 15.

FIG. 15 illustrates the light transmissive substrate 1200 with the light source 200 described above. The substrate 1200 is configured to receive light in a Lambertian distribution from the light source 200 at the plurality of second microstructures 1240 and transform the light into a batwing distribution exiting the second side 1214 of the base film 1210. The resulting batwing distribution, as illustrated in FIGS. 16A, 16B and 16C desirably has a peak intensity in a range of about ±30° to about ±60° from the X and Y axes and a minimum intensity at the nadir. In an embodiment, the light transmissive substrate 1200 may provide a batwing distribution that has a peak intensity at about ±45 from the X and Y axes and a minimum (near zero) intensity at the nadir. If the light transmissive substrate 1200 is positioned relative to the light source 200 such that the base film 1210 faces the light source 200, the light transmissive substrate 1200 will enhance the brightness of the light (i.e., provide brightness enhancement), as well as reduce glare (i.e., provide glare reduction) in two dimensions, as described above.

In some embodiments of the invention, the microstructures 1220, 1240 may be made from a material having a refractive index of about 1.5, although materials having different refractive indices may also be used as long as the desired effect can be achieved. In some embodiments of the invention, the base film 1210 may be made of a material that also has a refractive index of about 1.5, or a refractive index that matches or substantially matches the refractive index of the microstructures. The filler material 1230 may have a refractive index that is less than the refractive index of the microstructures. In an embodiment, the refractive index of the filler material 1230 may be about 1.3. For light sources that emit infrared beams, infrared transmitting materials that may not be transparent in the visible range of light may be used.

For any of the embodiments of the light transmissive substrate described herein, the roof angles of the microstructures may be adjusted, and/or textures may be added to the second surface of the base film to fine tune the distribution profile and to enhance the optical transmission efficiencies. As described above, the refractive index of the microstructures also has an influence on the batwing spreading performance and may be adjusted to optimize performance. The embodiment of the light transmissive substrate 1200 of FIGS. 12-14 may provide the performance advantage of the two-substrate embodiment of FIG. 10, i.e., a 2D batwing distribution, brightness enhancement and glare reduction, while also reducing the overall thickness and manufacturing cost. For example, the vertically integrated microstructures may be made on a single roll-to-roll process by two sequential replication steps (with the addition of the filler material in between the replication steps). In addition, the light transmissive substrate 1200 may substantially increase light transmission efficiency as compared to the two-substrate embodiment by eliminating any air gaps between the layers of microstructures. Embodiments of the invention may also provide brightness homogenization in combination with brightness enhancement and/or brightness homogenization in combination with glare reduction.

The embodiments described herein represent a number of possible implementations and examples and are not intended to necessarily limit the present disclosure to any specific embodiments. Instead, various modifications can be made to these embodiments, and different combinations of various embodiments described herein may be used as part of the invention, even if not expressly described, as would be understood by one of ordinary skill in the art. Any such modifications are intended to be included within the spirit and scope of the present disclosure and protected by the following claims.

What is claimed is:

1. A light transmissive substrate for transforming a Lambertian light distribution, the light transmissive substrate comprising:
    a base film having a first side and a second side opposite the first side;
    a plurality of first microstructures disposed on the first side of the base film, each of the first microstructures having a first peak defining a first roof angle;
    a plurality of first valleys, each of the first valleys defined by a pair of adjacent first microstructures;
    a filler material disposed in the plurality of first valleys and defining a substantially planar surface spaced from and substantially parallel to the first side of the base film; and
    a plurality of second microstructures disposed on the substantially planar surface of the filler material, each of the second microstructures having a second peak defining a second roof angle; and
    a plurality of second valleys, each of the second valleys defined by a pair of adjacent second microstructures.

2. The light transmissive substrate according to claim 1, wherein each of the plurality of first microstructures and the plurality of second microstructures is an elongated microprism having a triangular cross-section.

3. The light transmissive substrate according to claim 2, wherein the plurality of first microstructures and the plurality of second microstructures are orthogonal to each other.

4. The light transmissive substrate according to claim 1, wherein the first roof angle is between about 50 degrees and about 70 degrees.

5. The light transmissive substrate according to claim 4, wherein the first roof angle is about 60 degrees.

6. The light transmissive substrate according to claim 1, wherein the second roof angle is between about 70 degrees and about 90 degrees.

7. The light transmissive substrate according to claim 6, wherein the second roof angle is about 80 degrees.

8. The light transmissive substrate according to claim 1, wherein the filler material has a refractive index of between about 1.3 and about 1.5.

9. The light transmissive substrate according to claim 8, wherein the refractive index is about 1.3.

10. The light transmissive substrate according to claim 1, wherein the plurality of first microstructures and the plurality of second microstructures have refractive indices of between about 1.5 and about 1.7.

11. The light transmissive substrate according to claim 10, wherein the refractive indices are about 1.6.

12. The light transmissive substrate according to claim 1, wherein the second side of the base film is substantially planar.

13. The light transmissive substrate according to claim 1, wherein the second side of the base film comprises a texture.

14. A method for manufacturing a light transmissive substrate for transforming a Lambertian light distribution, the method comprising:
    creating a plurality of first microstructures and a plurality of first valleys on a first side of a base film, each of the plurality of first microstructures having a first peak defining a first roof angle, and each of the plurality of first valleys being defined by an adjacent pair of first microstructures;
    disposing a filler material in the plurality of first valleys to establish a substantially planar surface spaced from and substantially parallel to the first side of the base film; and
    creating a plurality of second microstructures and a plurality of second valleys on the substantially planar surface of the filler material, each of the plurality of second microstructures having a second peak defining a second roof angle, and each of the plurality of second valleys being defined by an adjacent pair of second microstructures.

15. The method according to claim 14, further comprising curing the filler material before creating the plurality of second microstructures and the plurality of second valleys.

16. The method according to claim 14, wherein each of the plurality of first microstructures and the plurality of second microstructures is an elongated microprism having a triangular cross-section.

17. The method according to claim 16, wherein the plurality of second microstructures are orthogonal to the plurality of first microstructures.

18. The method according to claim 14, wherein the first roof angle is between about 50 degrees and about 70 degrees.

19. The method according to claim 18, wherein the first roof angle is about 60 degrees.

20. The method according to claim 14, wherein the second roof angle is between about 70 degrees and about 90 degrees.

21. The method according to claim 20, wherein the second roof angle is about 80 degrees.

22. The method according to claim 14, wherein the filler material has a refractive index of between about 1.3 and about 1.5.

23. The method according to claim 22, wherein the refractive index is about 1.3.

24. The method according to claim 14, wherein the plurality of first microstructures and the plurality of second microstructures have refractive indices of between about 1.5 and about 1.7.

25. The method according to claim 24, wherein the refractive indices are about 1.6.

26. The method according to claim 14, further comprising texturing the second side of the base film.

\* \* \* \* \*